United States Patent
Sato et al.

(10) Patent No.: US 8,360,467 B2
(45) Date of Patent: Jan. 29, 2013

(54) HEAD-PROTECTING AIRBAG APPARATUS

(75) Inventors: Jun Sato, Kiyosu (JP); Makoto Yamanaka, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/369,351

(22) Filed: Feb. 9, 2012

(65) Prior Publication Data

US 2012/0248743 A1    Oct. 4, 2012

(30) Foreign Application Priority Data

Mar. 30, 2011 (JP) ................................. 2011-075075

(51) Int. Cl.
*B60R 21/16* (2006.01)
(52) U.S. Cl. .................................................. 280/730.2
(58) Field of Classification Search ............... 280/730.2, 280/743.1, 741, 742
See application file for complete search history.

(56) References Cited

U.S. PATENT DOCUMENTS

| | | | |
|---|---|---|---|
| 6,394,487 B1 * | 5/2002 | Heudorfer et al. ............ | 280/729 |
| 6,971,665 B2 * | 12/2005 | Tanaka ........................... | 280/729 |
| 7,744,121 B2 * | 6/2010 | Ishikawa et al. ........... | 280/730.2 |
| 7,766,378 B2 | 8/2010 | Miura et al. | |
| 2011/0101658 A1 * | 5/2011 | Konishi et al. .............. | 280/730.2 |

FOREIGN PATENT DOCUMENTS

| JP | A-2004-338542 | 12/2004 |
|---|---|---|
| JP | A-2007-069721 | 3/2007 |

* cited by examiner

*Primary Examiner* — Faye M. Fleming
(74) *Attorney, Agent, or Firm* — Posz Law Group, PLC

(57) ABSTRACT

A head-protecting airbag apparatus includes an inflated airbag with a rear inflatable portion covering the vicinity of a rear window of a vehicle, and a gas supply passage that inflates the rear portion. The rear inflatable portion includes a main body portion and an inlet inflatable portion, with a belt-shaped closing portion that partitions the two. The upper communication port and the lower communication port of the belt-shaped closing portion allow the inflation gas to flow from the inlet inflatable portion to the inflatable main body. In both communication ports, the opening area of the lower communication port is larger than the opening area of the upper communication port so that the airbag inflates via the lower communication port upon normal inflation of the airbag, and then inflates via the upper communication port upon abnormal inflation when the lower communication port is obstructed.

7 Claims, 19 Drawing Sheets

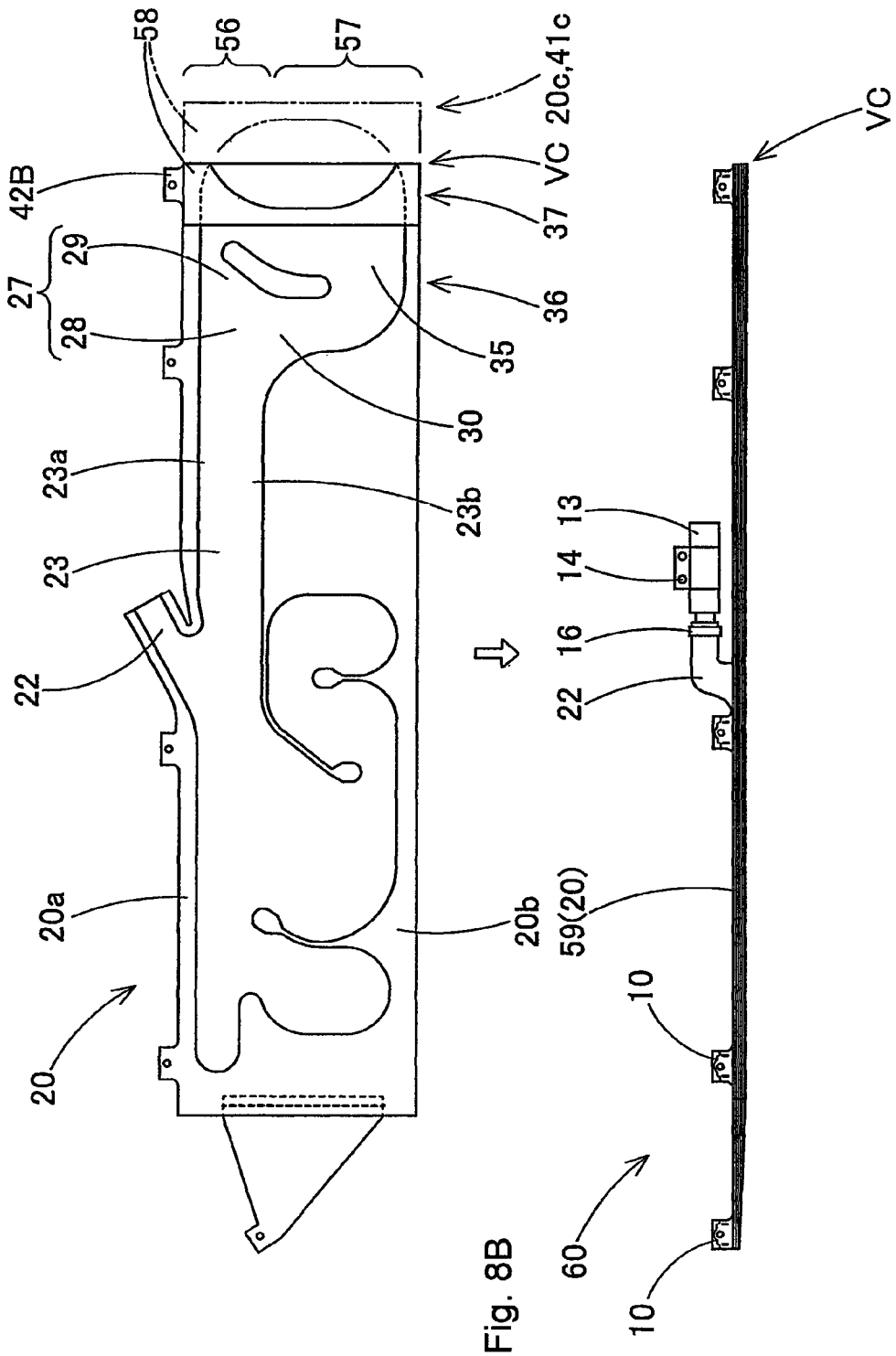

Fig.17A
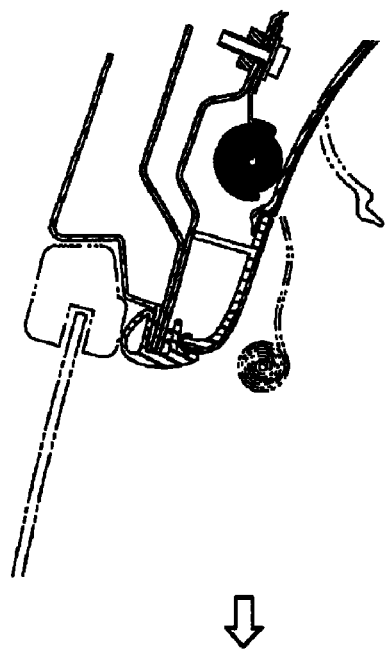
Fig.17B
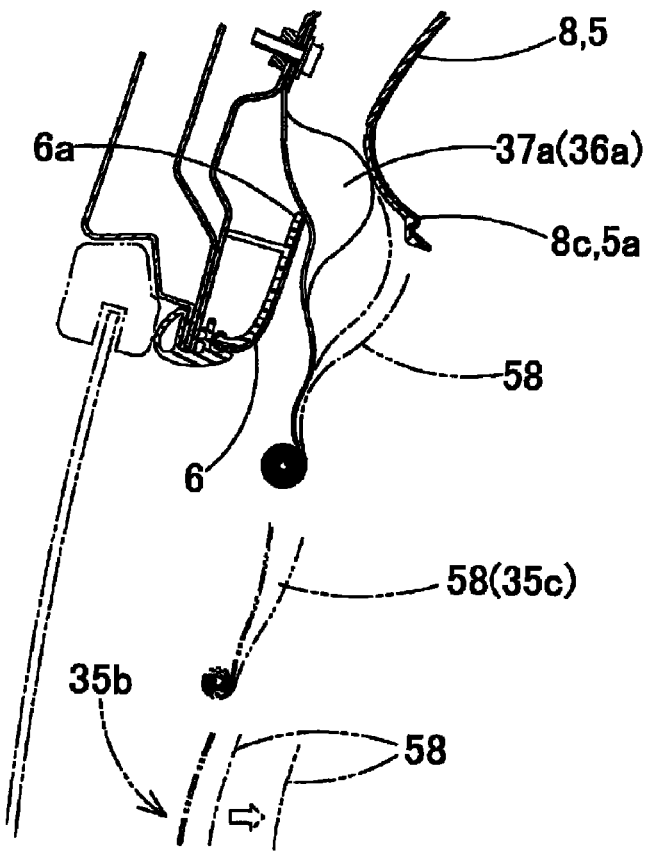

HEAD-PROTECTING AIRBAG APPARATUS

The present application claims priority from Japanese Patent Application No. 2011-75075 of Sato et al., filed on Mar. 30, 2011, the disclosures of which are hereby incorporated into the present application by reference.

BACKGROUND OF THE INVENTION

1. Field of the Invention

The present invention relates to a head-protecting airbag apparatus including an airbag capable of protecting the head of an occupant. An airbag of a head-protecting airbag apparatus is deployed and inflated downward by allowing inflation gas to flow thereinto from an upper edge of a window (side window) of a vehicle.

2. Background Art

In the related art, as head-protecting airbag apparatuses, there is one shown in JP-A-2007-69721. In this airbag apparatus, an airbag is smoothly deployed and inflated toward the interior of a vehicle from the vicinity of an upper end of a pillar garnish of a rear pillar, with a simple configuration without using a member to be mounted to the body side, such as a jump platform. In addition, the pillar garnish covers the interior of the rear pillar.

The airbag of this head-protecting airbag apparatus includes a rear inflatable portion and a gas supply passage. The rear inflatable portion is arranged at a rear portion of the airbag to cover the vehicle interior of a rear window (rear side window) at a side of a backseat of a vehicle and the rear pillar. A gas supply passage is a portion that allows inflation gas to flow into the rear inflatable portion. The rear inflatable portion includes an inflatable main body portion, an upper edge inflatable portion, and a branch inflatable portion. The upper edge inflatable portion is arranged above the inflatable main body portion to communicate with a rear portion of the gas supply passage. The branch inflatable portion is arranged at the front of the inflatable main body portion to communicate with a rear end of the gas supply passage, and allow inflation gas to flow into the inflatable main body portion. Moreover, in this airbag, the folded upper edge inflatable portion and gas supply passage are housed at a position of the vehicle exterior of the folded inflatable main body portion and branch inflatable portion so that, upon deployment and inflation, the inflatable main body portion can be pushed out toward the interior while riding over an upper end of the pillar garnish.

In this head-protecting airbag apparatus, the airbag is folded and housed at an upper edge of the window. Then, if inflation gas flows into the airbag, the gas supply passage arranged along a longitudinal direction and the upper edge inflatable portion inflate rapidly from the front side to the rear side in the rear inflatable portion. In that case, the gas supply passage and the upper edge inflatable portion push out the inflatable main body portion and the branch inflatable portion, which are arranged therebelow upon the completion of inflation, toward the interior. Therefore, the inflatable main body portion has been smoothly deployed so as to cover the interior of the rear pillar and the rear window along with the branch inflatable portion while riding over the upper end of the pillar garnish.

Additionally, in this head-protecting airbag apparatus, a region at least at a front end at a lower edge of the upper edge inflatable portion is arranged below an interior parting line of an upper end of the pillar garnish and a lower edge of an airbag cover in a state before the opening of the airbag cover upon the completion of inflation of the airbag. Therefore, at least a region at the front end of the upper edge inflatable portion is formed as a wedging inflatable portion. That is, this wedging inflatable portion is located at the interior of the upper end of the pillar garnish, and is inflated so as to be like a wedge between the interior of the upper end of the pillar garnish and the exterior of the lower edge of the airbag cover located above the rear pillar. The wedging inflatable portion greatly opens the airbag cover toward the interior, to maintain the open state. Therefore, the inflatable main body portion is able to complete its inflation by increasing the thickness thereof without protruding greatly toward the interior below the airbag cover that is greatly opened by the upper edge inflatable portion at the upper side of the rear pillar after being deployed so as to cover the interior of the rear pillar and the rear window. That is, the inflatable main body portion is able to complete its inflation by increasing the thickness thereof from a front portion toward a rear portion at a lower edge and from a lower edge toward an upper edge at the rear portion so as to extend along the interior of the rear window without protruding greatly toward the interior after being deployed.

However, in the related-art airbag, the whole region of the inflatable main body portion and the upper edge inflatable portion is vertically separated by a partitioning portion (closing portion). This partitioning portion has a rear end coupled to a gas non-inflow portion of the rear edge of the airbag, and is disposed so as to extend forward from the coupled portion. That is, this partitioning portion divides the inflatable main body portion and the upper edge inflatable portion in the whole region between the inflatable main body portion and the upper edge inflatable portion so as to obstruct the rear end of the upper edge inflatable portion.

Therefore, in this airbag apparatus, in a case where the head of an occupant is received and stopped by the branch inflatable portion during the deployment and inflation of the airbag, there is a concern that the flow of inflation gas to the inflatable main body portion may be suppressed, and the inflation gas may flow only into the upper edge inflatable portion. If the inflation gas flows only into the upper edge inflatable portion, the vicinity of the rear lower portion of the inflatable main body portion cannot be thickly swelled. Moreover, at this time, if the upper edge inflatable portion leaks inflation gas from the peripheral edge thereof due to a rise in internal pressure, the vicinity of the rear lower portion of the inflatable main body portion cannot further be thickly swelled.

SUMMARY OF THE INVENTION

The invention solves the above-described problems, and an object thereof is to provide a head-protecting airbag apparatus that smoothly and stably deploys and inflate a region at a rear portion of an airbag toward the interior in the vicinity of a rear pillar through a simple configuration.

A head-protecting airbag apparatus related to the invention has an airbag that is folded and housed at an upper edge of a window inside a vehicle, the airbag pushing an airbag cover open and deploying and inflating downward to cover the window upon inflow of inflation gas. The vehicle includes a rear pillar, a rear window adjacent to the rear pillar at the front of the rear pillar, and a pillar garnish covering the interior of the rear pillar. The airbag is disposed so as to be mounted to a vehicle body of the vehicle at an upper edge thereof upon the completion of inflation. Additionally, the airbag includes a gas inflow portion and a gas non-inflow portion. The gas inflow portion swells inflatable so as to allow inflation gas to flow thereinto and separate an interior wall portion and an exterior wall portion. The gas non-inflow portion inhibits inflation gas from flowing thereinto in a state where the interior wall portion and the exterior wall portion are coupled together.

Moreover, the gas inflow portion includes a rear inflatable portion arranged at a rear portion of the airbag to cover the interior of the pillar garnish and the rear window, and a gas supply passage arranged along a longitudinal direction at an upper edge at the front of the rear inflatable portion upon the completion of inflation to supply the inflation gas to the rear inflatable portion. Furthermore, the rear inflatable portion includes an inflatable main body portion that inflates in an area including a rear lower portion of the rear inflatable portion, and an inlet inflatable portion that communicates with a rear end of the gas supply passage, and inflates in an area including a front upper portion of the rear inflatable portion.

The inlet inflatable portion includes a wedging inflatable portion and a communication inflatable portion. The wedging inflatable portion is arranged at a rear upper portion of the inlet inflatable portion. The wedging inflatable portion is disposed so as to inflate continuously in an area ranging from the front of at least a front end portion of an interior parting line of an upper end of the pillar garnish in the state of the airbag cover before opening and a lower edge of the airbag cover to upper and lower portions of the front end portion, and is disposed so as to be like a wedge between the interior of the upper end of the pillar garnish and the exterior of the lower edge of the opened airbag cover upon the deployment and inflation of the airbag. The communication inflatable portion is arranged at a front lower portion of the inlet inflatable portion to communicate with a region at a front lower portion of the inflatable main body portion.

Furthermore, the airbag is folded and housed such that an upper edge portion thereof up to the vicinity of a lower edge of the gas supply passage at an upper edge of the airbag is arranged closer to the exterior than a portion below the upper edge portion of the airbag, at least at a rear portion thereof.

Additionally, the gas non-inflow portion includes a peripheral edge portion, a belt-shaped closing portion, and a plate-shaped closing portion. The peripheral edge portion surrounds the gas supply passage and the rear inflatable portion. The belt-shaped closing portion is arranged between the inflatable main body portion and the inlet inflatable portion apart from the peripheral edge portion to partition the inflatable main body portion and the inlet inflatable portion. The plate-shaped closing portion is arranged in front of the rear inflatable portion, and is disposed in an area extending upward from a lower edge of the peripheral edge portion to the gas supply passage.

An upper communication port that allows the inflatable main body portion and the wedging inflatable portion of the inlet inflatable portion to communicate with each other is disposed between a region at an upper end of the belt-shaped closing portion and an upper edge or rear edge of the peripheral edge portion. Additionally, a lower communication port that allows the inflatable main body portion and the communication inflatable portion of the inlet inflatable portion to communicate with each other is disposed between a region at a lower end of the belt-shaped closing portion and the plate-shaped closing portion or a lower edge of the peripheral edge portion.

The upper communication port and the lower communication port are disposed such that the opening area of the lower communication port is made larger than the opening area of the upper communication port. The upper communication port and the lower communication port are adapted such that the flow of inflation gas that reaches a rear lower portion of the inflatable main body portion via the upper communication port from the inlet inflatable portion that has inflated the wedging inflatable portion is suppressed to allow the inflation gas to flow to reach the rear lower portion of the inflatable main body portion via the lower communication port from the communication inflatable portion of the inlet inflatable portion, upon normal inflation of the airbag, according to the relationship of the opening area. Additionally, the upper communication port and the lower communication port are adapted such that, in the abnormal inflation of the airbag that inflates in a state where the inflow of the inflation gas from the lower communication port of the inflatable main body portion is regulated due to the difference in opening area, the inflation gas is made to flow to reach the rear lower portion of the inflatable main body portion via the upper communication port from the wedging inflatable portion of the inlet inflatable portion that has inflated the wedging inflatable portion.

In the head-protecting airbag apparatus related to the invention, if inflation gas flows into the airbag folded and housed at the upper edge of a window, the gas supply passage and the inlet inflatable portion connected to the rear side of the gas supply passage inflate rapidly in the rear inflatable portion. A portion including the inflatable main body portion that becomes a portion below the gas supply passage and the inlet inflatable portion upon the completion of inflation is pushed out toward the interior by the gas supply passage and the inlet inflatable portion. Therefore, the inflatable main body portion is deployed so as to cover the interior of the rear pillar and the rear window while riding over the upper end of the pillar garnish.

Moreover, the inlet inflatable portion arranges the wedging inflatable portion at the rear upper portion between the interior of the upper end of the pillar garnish and the exterior of the lower edge of the airbag cover located above the rear pillar, to inflate the wedging inflatable portion so as to be like a wedge. That is, the wedging inflatable portion opens the airbag cover widely toward the interior, to maintain the open state.

Therefore, the inflatable main body portion pushed out toward the interior by the inlet inflatable portion and the gas supply passage is inflated along the rear window by the inflation gas that flows in via the lower communication port from the communication inflatable portion of the inlet inflatable portion. That is, the inflatable main body portion is inflated by allowing inflation gas to flow in from the lower communication port having a larger opening area than the upper communication port. In other words, inflation gas flows downward at the rear edge of the plate-shaped closing portion, and flows toward the rear lower portion from the front lower portion and upward at the rear upper portion from the rear lower portion, at the lower edge of the inflatable main body portion. With this flow, the inflatable main body portion inflates smoothly in order so that the thickness thereof is increased in order. At this time, the wedging inflatable portion of the inlet inflatable portion already secures the push-open state of the airbag cover. Therefore, even if the portion of the inflatable main body portion in the vicinity of the upper communication port does not swell, the rear lower portion of the inflatable main body portion therebelow is arranged so as to be dragged and smoothly deployed downward by the front portion of the inflatable main body portion pushed out toward the interior upon inflation of the gas supply passage and the inlet inflatable portion, to cover the interior of the pillar garnish. As a result, the inflatable main body portion can be smoothly inflated so that the thickness thereof is increased with the flow of inflation gas.

Further, when the inflatable main body portion is pushed out toward the interior by the inlet inflatable portion and the gas supply passage and is deployed toward the interior of the rear window or pillar garnish, the head of an occupant or the like may move in the direction of the exterior, for example, at the lower portion of the inlet inflatable portion to obstruct the vicinity of the lower communication port so as to regulate the flow of inflation gas. In this case, in other words, the inflatable main body portion can complete its inflation as follows in the case of abnormal inflation of the airbag. That is, the inflatable main body portion is inflated so that the rear upper portion swells and then swells toward the rear lower portion from the rear upper portion at the upper edge by the inflation gas flowing in via the upper communication port from the wedging inflatable portion of the inlet inflatable portion and so that the rear lower portion and the front lower portion are increased in thickness in order. In other words, the inflatable main body portion can be inflated to cover the interior of the pillar garnish and the rear window in the vicinity of the pillar garnish. As a result, the inflatable main body portion can prevent the head of an occupant received and stopped in the vicinity of the lower communication port of the inflatable main body portion from moving to the exterior, and can stably restrain the occupant to the interior.

Accordingly, in the head-protecting airbag apparatus related to the invention, through the simple configuration of the airbag itself according to the setting of the opening areas of the upper communication port and the lower communication port and the setting of the inlet inflatable portion in the airbag, a region at the rear portion of the airbag can be smoothly and stably deployed and inflated toward the interior in the vicinity of the rear pillar. Therefore, the stable restraint performance of the occupant can be exhibited in the head-protecting airbag apparatus related to the invention.

Additionally, in the head-protecting airbag apparatus related to the invention, it is desirable to configure the airbag as follows. That is, the airbag is disposed such that the belt-shaped closing portion has a boomerang shape in which the upper end is offset rearward from the lower end as seen from the interior. In the airbag, the upper communication port is disposed between the upper end of the belt-shaped closing portion, and a portion disposed along the longitudinal direction of the upper edge of the peripheral edge portion.

In such a configuration, the inflatable main body portion does not provide the closing portion in a range from the lower edge of the rear inflatable portion to the upper edge thereof behind the belt-shaped closing portion of the airbag. Therefore, the inflatable main body portion can be vertically broadly and thickly inflated behind the belt-shaped closing portion. As a result, the rear inflatable portion of the airbag that has completed its inflation can receive and stop the occupant's head with excellent cushioning properties, in a vertically wide range at the rear portion.

Additionally, in a case where the upper communication port is provided between the upper end of the belt-shaped closing portion and the upper edge of the peripheral edge portion as described above, it is desirable that the length dimension between the upper end of the belt-shaped closing portion and the rear edge of the inflatable main body portion is set to a range of ⅓ to ⅔ of the length dimension from the front edge of the rear inflatable portion to the rear edge thereof as a state where the lower communication port can be secured.

In such a configuration, upon the completion of inflation of an airbag, the inflatable main body portion can be inflated with excellent cushioning properties in a longitudinal wide range from the upper edge of the airbag to the lower edge thereof.

In addition, the upper communication port may be disposed between the belt-shaped closing portion and the rear edge of the peripheral edge portion. In this case, the airbag may be adapted such that the belt-shaped closing portion has a boomerang shape having a vertical line portion that extends vertically, and a horizontal line portion that extends rearward from an upper end of the vertical line portion, and the upper communication port is disposed between a rear end of the horizontal line portion at an upper end of the belt-shaped closing portion and the rear edge of the peripheral edge portion.

Moreover, in the head-protecting airbag apparatus related to the invention, it is desirable that the opening area of the lower communication port is set in a range of 5 to 8 times, preferably in a range of 6 to 7 times the opening area of the upper communication port.

That is, if the opening area of the lower communication port is made less than 5 times the opening area of the upper communication port, the opening area of the upper communication port is made relatively excessively larger than the opening area of the lower communication port. As a result, upon the normal inflation of the airbag, the amount of inflow of inflation gas that flows into the inflatable main body portion from the upper communication port increases, and the inflation gas from the upper communication port collides with the inflation gas that flows in from the lower communication port. Therefore, in the airbag, it is difficult to secure the behavior upon normal inflation, that is, the behavior that the inflatable main body portion inflates stably along the rear window such that the inflatable main body portion inflates in order from the front lower portion of the inflatable main body portion toward the rear lower portion and further from the rear lower portion toward the rear upper portion. As a result, in a case where the opening area of the lower communication port is set to less than 5 times the opening area of the upper communication port, the inflatable main body portion is apt to have the behavior that it wobbles and inflates in the vehicle width direction, which is not preferable.

On the other hand, if the opening area of the lower communication port is made to exceed 8 times the opening area of the upper communication port, the opening area of the upper communication port is made relatively excessively smaller than the opening area of the lower communication port. Therefore, upon the abnormal inflation of the airbag, the amount of inflow of inflation gas that flows into the inflatable main body portion from the upper communication port decreases, and the inflation of the portion ranging from the vicinity of the rear lower portion of the inflatable main body portion to the vicinity of the lower communication port is delayed. As a result, in a case where the opening area of the lower communication port is made to exceed 8 times the opening area of the upper communication port, it is difficult for the inflatable main body portion to exhibit rapid restraint performance, which is not preferable.

Moreover, in the head-protecting airbag apparatus related to the invention, it is desirable that the airbag is adapted such that the lower edge of the rear inflatable portion is arranged up to below a belt-line at the lower edge of the rear window upon the completion of deployment and inflation.

In such a configuration, the rear inflatable portion covers the upper edge of the rear window to the lower edge thereof in front of the pillar garnish upon the completion of inflation of the airbag. Since the rear inflatable portion has a lower edge itself supported by a lower edge member of the rear window, without using the lower edge itself as a free end, the rear inflatable portion is not easily moved to the exterior. As a result, even if the rear inflatable portion of the airbag can restrain an occupant who is directed to the exterior via the rear window to the interior more exactly, not only upon normal inflation but also upon abnormal inflation.

Additionally, in the head-protecting airbag apparatus related to the invention, it is desirable that the folded-up shape of the airbag in the folding of making a region at the lower edge of the airbag when the airbag is housed approach a region at the upper edge is configured as follows. That is, first, the rear edge of the airbag is folded forward so that a vertical folding line is imparted to the rear side of the mounting portion at the rear end of the airbag to the vehicle body, and the rear-side portion of the upper communication port is overlapped in the vehicle width direction. A folding shape in which the lower edge of the airbag is made to approach the upper edge is provided.

In such a configuration, the rear inflatable portion can be deployed and inflated while extending rearward as much as a folded dimension, upon folding and housing, at the rear portion of the airbag. That is, in the embodiment, even if the airbag is compactly housed at the rear portion of the airbag, the interior of the rear pillar garnish and the rear window can be covered in a wide range upon the completion of inflation.

Additionally, in such a configuration, even if a region at the rear edge of the inflatable main body portion upon the completion of deployment and inflation is arranged at the rear side apart from the inlet inflatable portion, the region at the rear edge is folded and arranged at the front side close to the inlet inflatable portion upon folding and housing. Therefore, in an early stage of inflation, the vicinity of the inlet inflatable portion smoothly pushes out the region at the rear edge of the inflatable main body portion upon the completion of deployment and inflation toward the interior while riding over the upper end of the pillar garnish. Thereafter, the inflatable main body portion can be smoothly deployed and inflated in a state where the region at the rear edge is extended, while eliminating the folding line that is folded forward. That is, even if the rear edge is folded forward and housed, the whole region of the inflatable main body portion can be smoothly deployed and inflated.

BRIEF DESCRIPTION OF THE DRAWINGS

FIGS. 8A and 8B are views illustrating the folded-up shape of the airbag of the embodiment.

FIGS. 17A and 17B are cross-sectional views showing the head-protecting airbag apparatus of the embodiment in operation in order, taken along to the position of the line XVII-XVII of FIG. 16 when the airbag is abnormally inflated.

DETAILED DESCRIPTION OF THE INVENTION

Preferred embodiments of the present invention will be described below with reference to the accompanying drawings. However, the invention is not limited to the embodiments disclosed herein. All modifications within the appended claims and equivalents relative thereto are intended to be encompassed in the scope of the claims.

Figure 1:
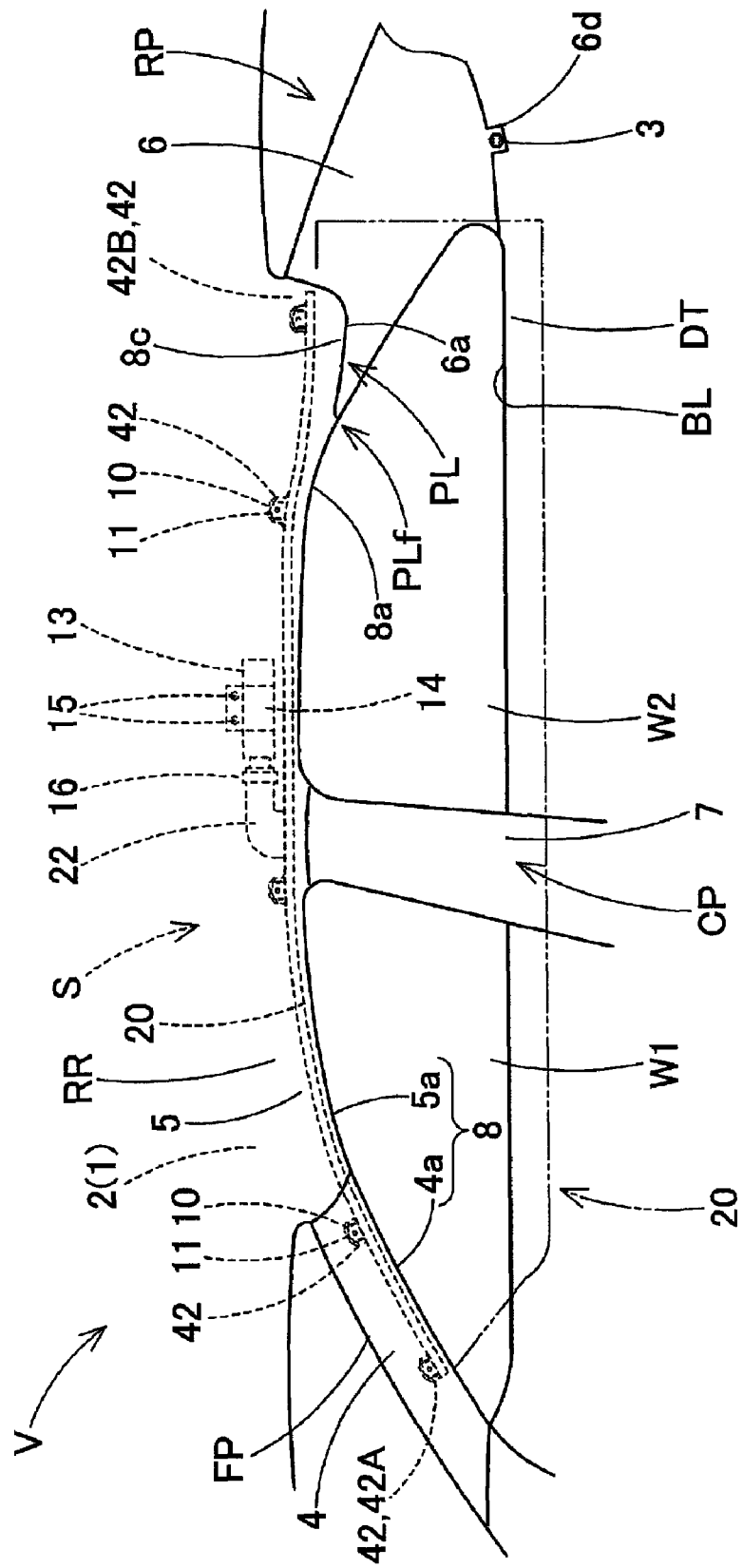
FIG. 1 is a front view when a head-protecting airbag apparatus of the embodiment of the invention is seen from the interior.

A head-protecting airbag apparatus S of an embodiment, as shown in FIG. 1, includes an airbag 20, an inflator 13, mounting brackets 10 and 14, and an airbag cover 8. The airbag 20 is folded and housed in a range from a region at a lower edge of a front pillar FP via a region at a lower edge of a roof side rail RR to the upper side of a rear pillar RP, at upper edges of windows (side windows) W1 and W2 inside the vehicle V.

As shown in FIGS. 1 and 8, the inflator 13 has a substantially columnar cylinder type, and is inserted into a joint port 22 of the airbag 20, and is connected with the airbag 20 by a clamp 16 fastened from the outer peripheral side of the joint port 22. The inflator 13 is mounted and fixed to an inner panel 2 of the roof side rail RR in the vicinity of and above a center pillar CP by a mounting bracket 14 while being covered with a lower edge 5a of a roof head lining 5. In addition, the inner panel 2 is a member on the side of a body (vehicle body) 1 of the vehicle V. Additionally, the mounting bracket 14 is made of sheet metal, holds an inflator 13, and is fixed to the inner panel 2 by mounting bolts 15.

Figure 13A:
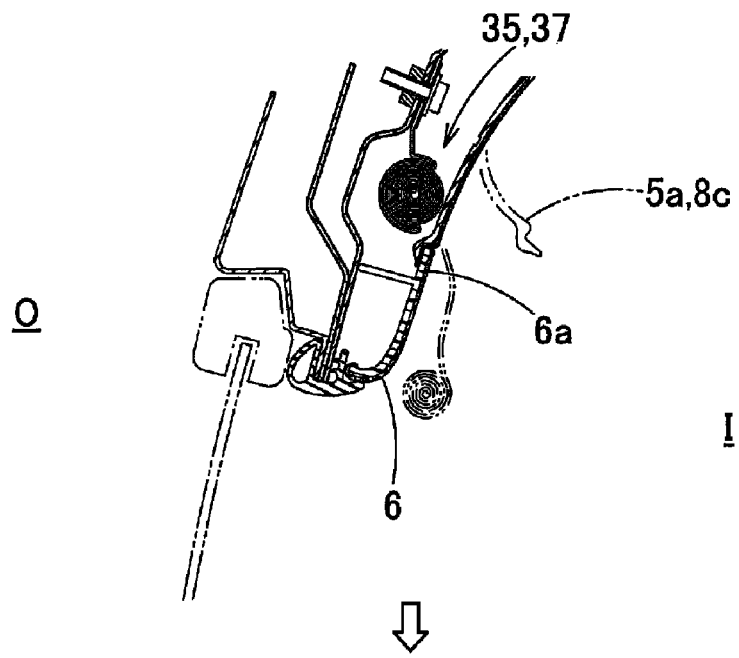
FIGS. 13A and 13B are cross-sectional views showing the head-protecting airbag apparatus of the embodiment in operation in order, taken along the position of the line XIII-XIII of FIG. 3.
Figure 13B:
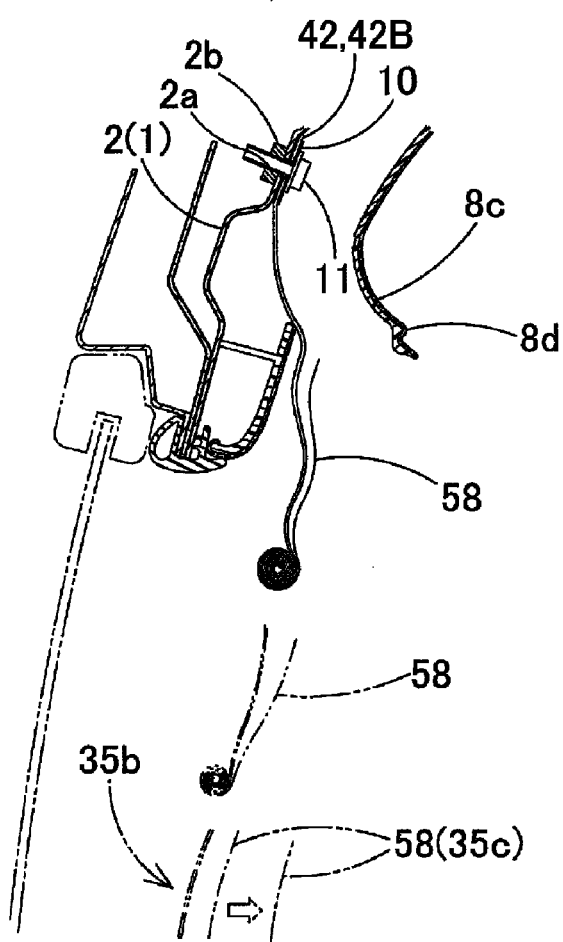

Each mounting bracket 10 mounts and fixes each mounting portion 42 of the airbag 20 to the inner panel 2 by a mounting bolt 11 (refer to FIGS. 9 and 13). In addition, each mounting bolt 11 is fastened to a mounting hole 2a formed in the inner panel 2. The mounting hole 2a is provided with a nut 2b that fastens the mounting bolt 11. The airbag cover 8 includes a lower edge 4a of a front pillar garnish 4 arranged at the front pillar FP and a lower edge 5a of the roof head lining 5 arranged at the roof side rail RR. In addition, the front pillar garnish 4 and the roof head lining 5 are made of synthetic resin, and are mounted and fixed to the interior of the inner panel 2 of the body 1 at the front pillar FP and the roof side rail RR, respectively. Additionally, the roof head lining 5 is disposed from the vicinity of the upper side of the front pillar FP via above the center pillar CP to the vicinity of the upper side of the rear pillar RP.

In addition, the airbag cover 8 includes, in the vicinity of the rear window W2, a window-side portion 8a above the rear window W2 and a pillar-side portion 8c above the rear pillar garnish 6.

A rear pillar garnish 6 and a center pillar garnish 7 made of synthetic resin are disposed at the interior of the rear pillar RP and the center pillar CP, respectively. In addition, in the embodiment, the center pillar garnish 7 is provided with a support rib, serving also as a jump platform, which extends toward the exterior from its upper end and abuts against, and therefore being supported by, the inner panel 2. A top face of the support rib serves as a guide face that guides the airbag 20 to deploy and inflate, toward the interior without being caught by the upper end of the center pillar garnish.

Figure 10A:
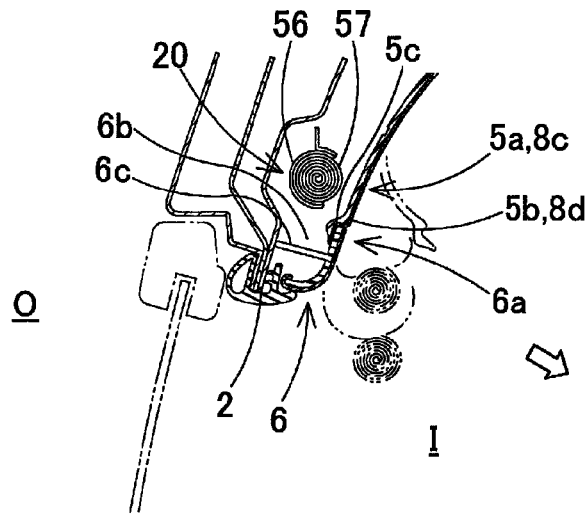
FIGS. 10A, 10B, and 10C are cross-sectional views showing the head-protecting airbag apparatus of the embodiment in operation in order, taken along the position of the line X-X of FIG. 3.
Figure 10B:
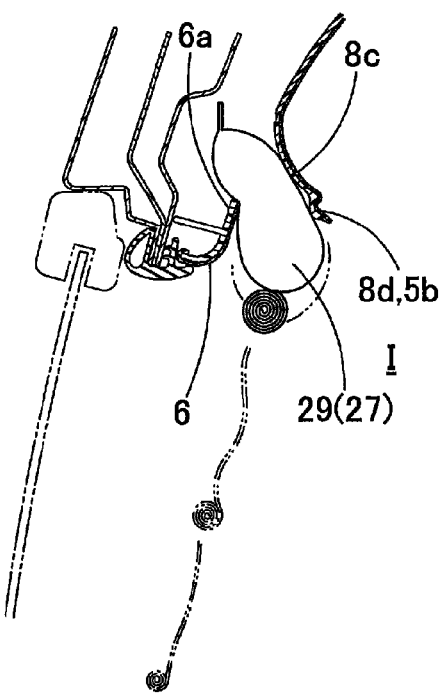
Figure 10C:
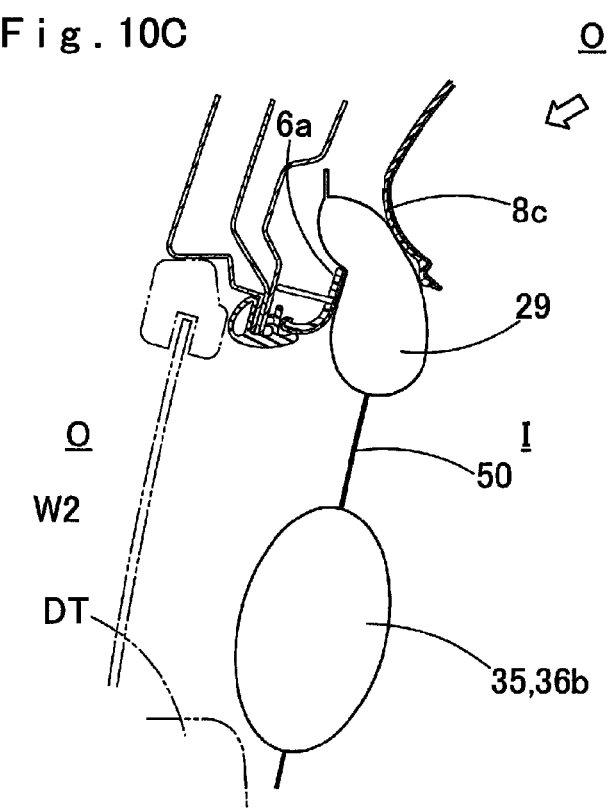

On the other hand, as shown in FIG. 10, the rear pillar garnish 6 is provided with a support rib 6c at the exterior O. The support rib 6c protrudes toward the exterior O coming down from an upper end 6a to abut against, and therefore be supported by, the inner panel 2. A recess 6b is formed between the upper end 6a and the support rib 6c. The rear pillar garnish 6 is mounted to the inner panel 2 so that the upper end 6a is fitted into a recess 5c of the lower end 5b (a lower edge 8d of the pillar-side portion 8c) at the lower edge 5a (the pillar-side portion 8c) of the roof head lining 5, while the support rib 6c is pressed against the inner panel 2 in a state where a mounting portion 6d (refer to FIG. 1) at its lower end of the pillar garnish 6 is fixed to the inner panel 2 with a bolt 3. Therefore, in order that the support rib 6c does not strike the lower end 5b when being mounted, a jump platform cannot be formed at the upper end 6a of the exterior O, and the recess 6b is formed.

As shown in FIGS. 1 to 7, when inflation gas G is made to flow in from the inflator 13, the airbag 20 is developed from a folded state and deploys and inflates so as to cover the interiors I of the side windows W1 and W2, the center pillar CP, the center pillar garnishes 7 and the rear pillar garnish 6 of the rear pillar RP. As shown in FIGS. 2 to 7, the airbag 20 includes a gas inflow portion 21 and a gas non-inflow portion 40. The gas inflow portion 21 is made inflatable so as to allow inflation gas G to flow thereinto and separate an interior wall portion 21a and an exterior wall portion 21b. The gas non-inflow portion 40 inhibits inflation gas G from flowing thereinto in a state where the interior wall portion 21a and the exterior wall portion 21b are coupled together. The airbag 20 is manufactured by hollow-weaving method using polyamide yarn, polyester yarn or the like, except a triangular plate-shaped portion 54 at the front end. In addition, the plate-shaped portion 54 is coupled to the front end of the airbag 20 by sewing or the like. Additionally, in the embodiment, the airbag 20 includes a front inflatable portion 24 that swells in an interior area of the front window W1 located at a side of a front seat and the center pillar CP, and a rear inflatable portion 26 that swells in an interior area of the rear window W2 located at a side of a rear seat and the rear pillar RP.

The non-inflow portion 40 of the airbag 20 includes a peripheral edge portion 41, the mounting portion 42, a closing portion 44, and the plate-shaped portion 54. The peripheral edge portion 41 is arranged so as to surround the gas inflow portion 21.

Plural (five in the embodiment) the mounting portions 42 are formed so as to protrude upward from the peripheral edge portion 41 at the upper edge 20a of the airbag 20. Each mounting portion 42 is formed with a mounting hole 42a that allows the mounting bolt 11 (refer to FIG. 9) to be inserted therethrough. As already described, the mounting bracket 10 for attachment to the inner panel 2 is secured to each mounting portion 42, and the bolt 11 inserted through each mounting hole 42a is screwed into the nut 2b, thereby fixing the airbag to the inner panel 2.

The plate-shaped portion 54 is formed of woven fabric of polyester or the like, and is coupled to the front end of the airbag 20 by sewing or the like. In addition, the mounting portion 42 (42A) is also formed at the front end of the plate-shaped portion 54.

The closing portion 44 is disposed so as to extend from the peripheral edge portion 41 and enter the region of the front inflatable portion 24 and the rear inflatable portion 26. The closing portion 44 is disposed in order to control the flow of inflation gas G or regulate the thickness of the airbag 20 so that the airbag can be inflated into a plate shape. The closing portion 44 includes a front closing portion 45, a front lower closing portion 46, a front upper closing portion 47, a front lower closing portion 48, a belt-shaped closing portion 50, and a plate-shaped closing portion 52 that protrude from the inner peripheral side of the peripheral edge portion 41.

The plate-shaped closing portion 52 has a rectangular plate shape, and is disposed in an area extending upward from a lower edge 41b of the peripheral edge portion 41 located at the lower edge 20b of the airbag 20 to the lower portion of a gas supply passage 23 so as to partition the front inflatable portion 24 and the rear inflatable portion 26 between the front inflatable portion 24 and the rear inflatable portion 26. The rear edge 52a extends substantially vertically and partitions a region at a front edge 26a of the rear inflatable portion 26. The plate-shaped closing portion 52 is disposed in order to secure an entire shape of the airbag 20 and to shorten the time period from the start of inflation of the airbag 20 to the completion of inflation thereof by reducing the volume of the gas inflow portion 21.

The front closing portion 45, the front lower closing portion 46, the front upper closing portion 47, and the front lower closing portion 48 are disposed so as to enter the front inflatable portion 24, and divides the front inflatable portion 24 into plural inflatable portions, that is, a body cell portion 24a, a front-side cell portion 24b, a distal end cell portion 24c, and a pressure-adjusting chamber 24d. In addition, the front lower closing portion 48 divides the pressure-adjusting chamber 24d as will be described below, back and forth.

The belt-shaped closing portion 50 is arranged in the rear inflatable portion 26. The belt-shaped closing portion 50 is made to extend vertically at its lower portion (lower end 50b) and incline obliquely rearward at its upper portion (upper end 50a), thereby forming a boomerang shape in which the upper end 50a is offset rearward from the lower end 50b as seen from the interior. The belt-shaped closing portion 50 is disposed apart from the upper edge 41a, lower edge 41b, and rear edge 41c of the peripheral edge portion 41, and also the rear edge 52a of the plate-shaped closing portion 52. The belt-shaped closing portion 50, as will be described below, is disposed so as to partition an inlet inflatable portion 27 at a front upper portion 26c and an inflatable main body portion 35 at a rear lower portion 26d in the rear inflatable portion 26.

In the embodiment, the gas inflow portion 21 includes the joint port 22, the gas supply passage 23, the front inflatable portion 24, and the rear inflatable portion 26. The gas supply passage 23 is disposed linearly along the longitudinal direction of the vehicle V at the upper edge 20a of the airbag 20 to connect the front inflatable portion 24 and the rear inflatable portion 26 above the plate-shaped closing portion 52. The joint port 22 extends upward from a longitudinal middle portion at the upper edge 20a of the airbag 20, and is connected with the inflator 13 so as to allow the inflation gas G supplied from the inflator 13 to flow into the gas inflow portion 21. A flow regulating cloth (not shown) that is inserted into the gas supply passage 23 is disposed in the joint port 22. The flow regulating cloth diverges the inflation gas G supplied from the inflator 13 toward both the front and rear so the inflation gas G flows toward both the front and rear of the vehicle V in the gas supply passage 23.

Figure 15:
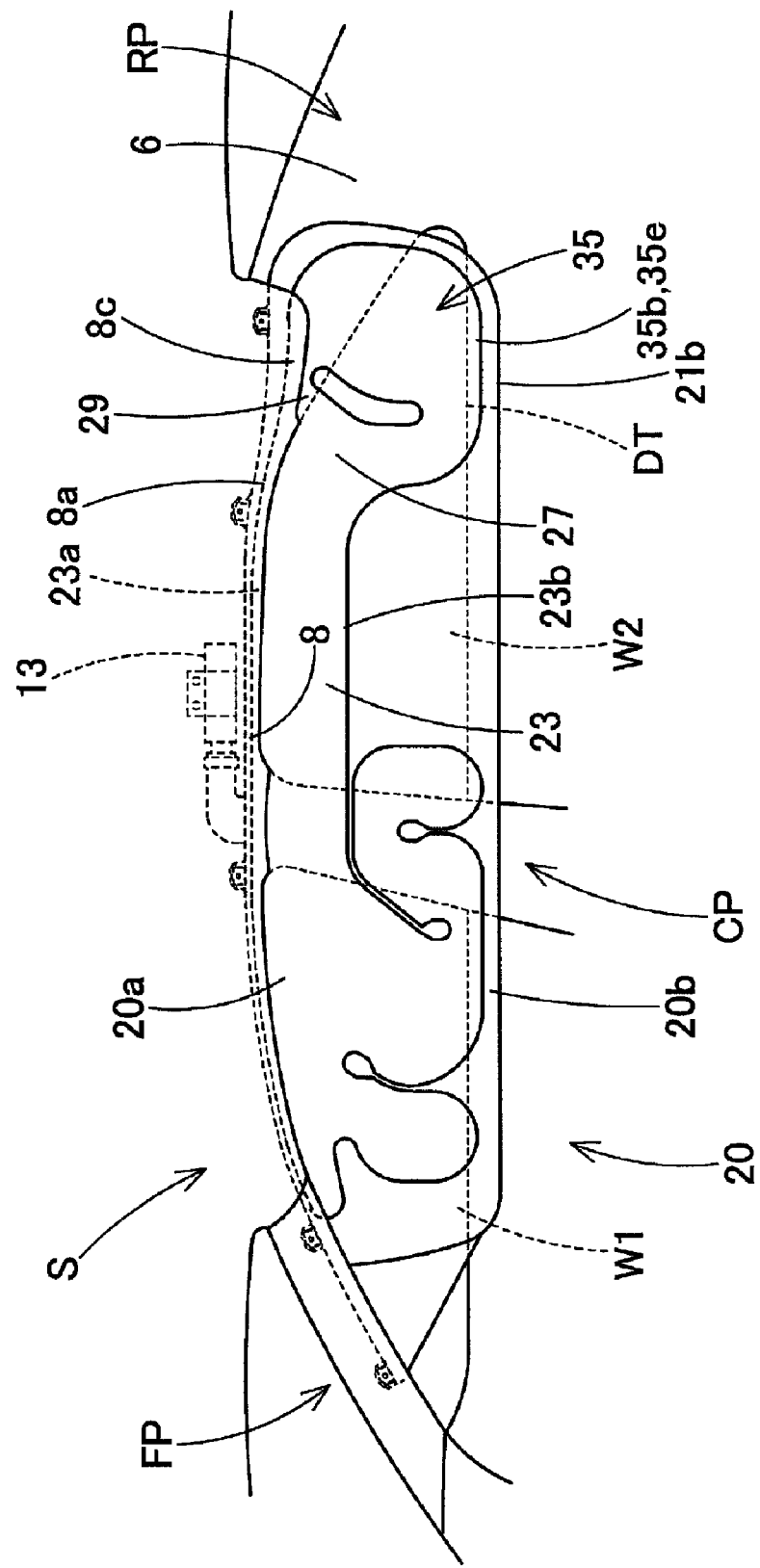
FIG. 15 is a front view when the head-protecting airbag apparatus of the embodiment of the invention having completed operation is seen from the interior of FIG. 1.

In addition, the gas supply passage 23 is designed so that a region at the upper edge 23a is covered with the airbag cover 8, and a region at the lower edge 23b protrudes downward from the airbag cover 8 when the airbag mounted on the vehicle is fully inflated (refer to FIG. 15).

The front inflatable portion 24 is disposed at a front portion of the airbag 20, and as shown in FIG. 15, deploys and inflates in the interior region of the front window W1 and the center pillar CP. The front inflatable portion 24, as already described, is divided into the body cell portion 24a, the front-side cell portion 24b, the distal end cell portion 24c, and the pressure-adjusting chamber 24d, which are plural inflatable portions, by the closing portion 44 (the front closing portion 45, the front lower closing portion 46, the front upper closing portion 47, and the front lower closing portion 48). When the internal pressure of the body cell portion 24a or the like has risen, the pressure-adjusting chamber 24d allows inflation gas to flow in from the body cell portion 24a to prevent an abrupt rise in the internal pressure of the body cell portion 24a. The distal end cell portion 24c is disposed in order to smoothly open the lower edge 4a of the front pillar garnish 4.

The rear inflatable portion 26 is disposed at a rear portion of the airbag 20, and as shown in FIGS. 2 to 7, includes the inflatable main body portion 35 that inflates in an area including the rear lower portion 26d of the rear inflatable portion 26, and the inlet inflatable portion 27 that inflates in an area including the front upper portion 26c of the rear inflatable portion 26. The inflatable main body portion 35 and the inlet inflatable portion 27 are disposed with the belt-shaped closing portion 50 being arranged therebetween while being allowed to communicate with each other at an upper communication port 32 and a lower communication port 33 to be described below. In other words, the inflatable main body portion 35 and the inlet inflatable portion 27 are partitioned by the belt-shaped closing portion 50 while being allowed to communicate with each other at the upper communication port 32 and the lower communication port 33.

In addition, in the embodiment, the rear inflatable portion 26 is constituted by two inflatable portions partitioned by only one belt-shaped closing portion 50, that is, the inlet inflatable portion 27 and the inflatable main body portion 35, without disposing the pressure-adjusting chamber.

Additionally, in the embodiment, the upper communication port 32 is disposed between the upper end 50a of the belt-shaped closing portion 50 and a rear upper portion 41d of the peripheral edge portion 41. The rear upper portion 41d is a portion that is arranged along the longitudinal direction at a rear portion in the upper edge 41a of the peripheral edge portion 41, and is close proximity to the upper end 50a. Specifically, in the upper communication port 32 has a semicircular shape that swells upward at the upper end 50a, and is disposed between its peak portion and the rear upper portion 41d of the peripheral edge portion 41. The lower communication port 33 is disposed at mutually closest portions between the vicinity of the lower end 50b of the belt-shaped closing portion 50 and the rear edge 52a of the plate-shaped closing portion 52. Specifically, the lower end 50b has a semicircular shape that swells downward, the rear edge 52a is also formed as a ¼ circle-shaped curved portion 52c that swells upward in the vicinity at an upper corner thereof, and the lower communication port 33 is disposed between mutual straight portion 50c and 52b in the vicinity of the lower end 50b.

The inlet inflatable portion 27 includes a front end inflatable portion 28, a wedging inflatable portion 29, and a communication inflatable portion 30. The front end inflatable portion 28 communicates with a rear end 23c of the gas supply passage 23. The wedging inflatable portion 29 is arranged at a rear upper portion of the inlet inflatable portion 27 located behind the front end inflatable portion 28. The communication inflatable portion 30 is arranged at a lower portion of the inlet inflatable portion 27 located below the front end inflatable portion 28. The front end inflatable portion 28 is disposed such that the vertical width dimension thereof is made larger than the gas supply passage 23 so as to inflate more thickly than the gas supply passage 23.

Figure 11A:
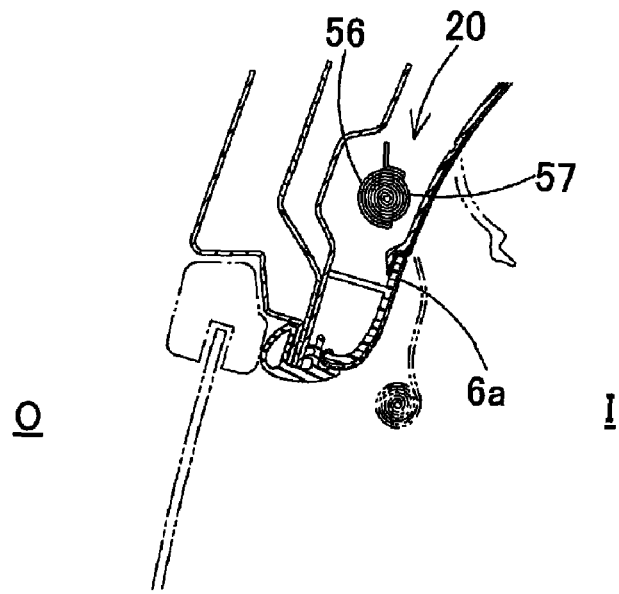
FIGS. 11A and 11B are cross-sectional views showing the head-protecting airbag apparatus of the embodiment in operation in order, taken along the position of the line XI-XI of FIG. 3.
Figure 11B:
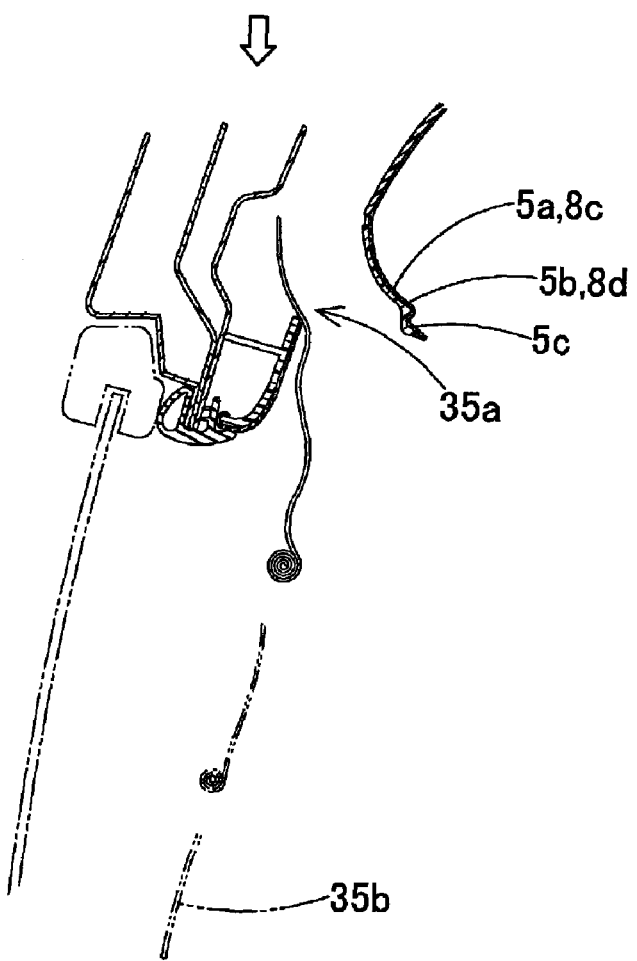

The wedging inflatable portion 29 is disposed between the belt-shaped closing portion 50, and the upper edge 41a of the peripheral edge portion 41 immediately above the belt-shaped closing portion 50. The wedging inflatable portion 29 is formed as a portion from above a front end 50e at an upper edge 50d of the belt-shaped closing portion 50 to the upper communication port 32. The wedging inflatable portion 29 is disposed so as to inflate continuously in an area ranging from the front of at least a front end portion PLf of a parting line PL to the upper and lower sides of the front end portion PLf. The parting line PL is an interior boundary line between the upper end 6a of the rear pillar garnish 6 and the lower edge 8d of the pillar-side portion 8c of the airbag cover 8, in the state of the airbag cover 8 before opening. The wedging inflatable portion 29 is disposed so as to be like a wedge between the interior I of the upper end 6a of the rear pillar garnish 6 and the exterior O of the lower edge 8d of the pillar-side portion 8c of the opened airbag cover 8 upon the inflation of the airbag 20 (refer to FIGS. 10 to 12).

The communication inflatable portion 30 is a portion extending to the lower communication port 33 below the front end inflatable portion 28. In the embodiment, the communication inflatable portion 30 is a portion between the straight portion 50c of the belt-shaped closing portion 50 and the curved portion 52c of the rear edge 52a of the plate-shaped closing portion 52 at the front thereof.

In the embodiment, the inflatable main body portion 35 is adapted in a wide range having a portion surrounded by a rear edge 50f of the belt-shaped closing portion 50, the upper communication port 32, the rear upper portion 41d of the peripheral edge portion 41 behind the upper communication port 32, the rear edge 41c of the peripheral edge portion 41 that becomes the rear edge 26b of the rear inflatable portion 26 itself, a lower edge 26e of the rear inflatable portion 26 in the lower edge 41b of the peripheral edge portion 41, the rear edge 52a of the plate-shaped closing portion 52 that becomes a portion of the front edge 26a of the rear inflatable portion 26 itself extending to the lower communication port 33, and the lower communication port 33.

The inflatable main body portion 35 swells so as to cover the interior I of the rear window W2 adjacent to the rear pillar RP at the front of the rear pillar, and the rear pillar RP, when the deployment and inflation of the airbag 20 is completed. Moreover, in the embodiment, the inflatable main body portion 35 in the completion of inflation is adapted so as to locate a lower edge 35b up to the lower side of a belt line BL at the lower edge of the rear window W2.

As for the upper communication port 32 and the lower communication port 33, the opening area DS of the lower communication port 33 is made larger than the opening area US of the upper communication port 32. The size relationship between the opening areas US and DS is set as follows. That is, in the rear inflatable portion 26, when inflation gas G has flowed into the inlet inflatable portion 27 from the gas supply passage 23, normally, the flow of the inflation gas G that reaches a rear lower portion 37b of the inflatable main body portion 35 via the upper communication port 32 from the inlet inflatable portion 27 that has inflated the wedging inflatable portion 29 is suppressed to allow the inflation gas G to flow to reach the rear lower portion 37b of the inflatable main body portion 35 via the lower communication port 33 from the communication inflatable portion 30 of the inlet inflatable portion 27. In the abnormal inflation in which inflation is made in a state where the inflow of the inflation gas G from the lower communication port 33 of the inflatable main body portion 35 is regulated, the inflation gas G is made to flow to reach the rear lower portion 37b of the inflatable main body portion 35 via the upper communication port 32 from the wedging inflatable portion 29 of the inlet inflatable portion 27 that has inflated the wedging inflatable portion 29.

Figure 5:
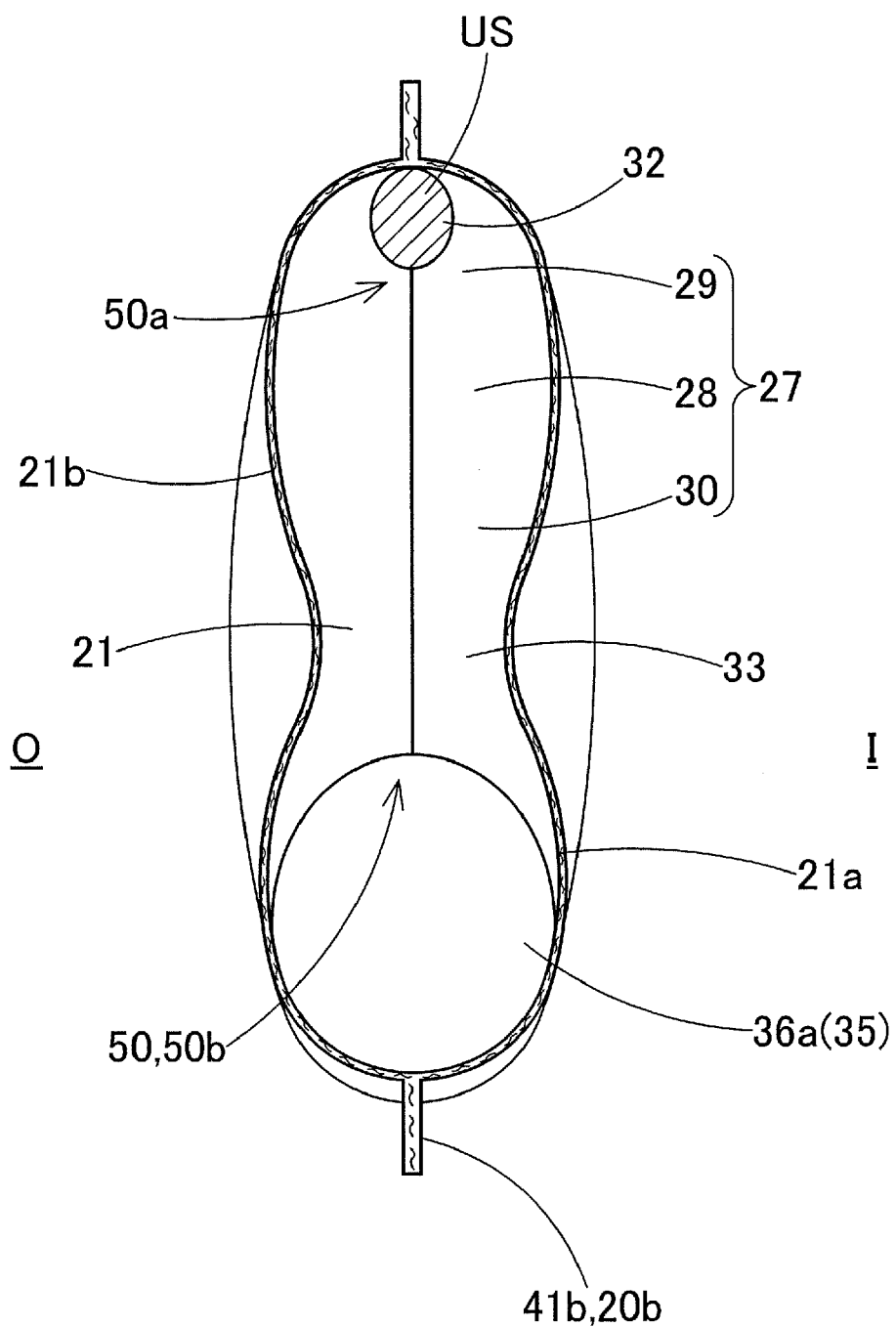
FIG. 5 is a cross-sectional view of the airbag of the embodiment upon inflation taken along the line V-V of FIG. 3.
Figure 7:
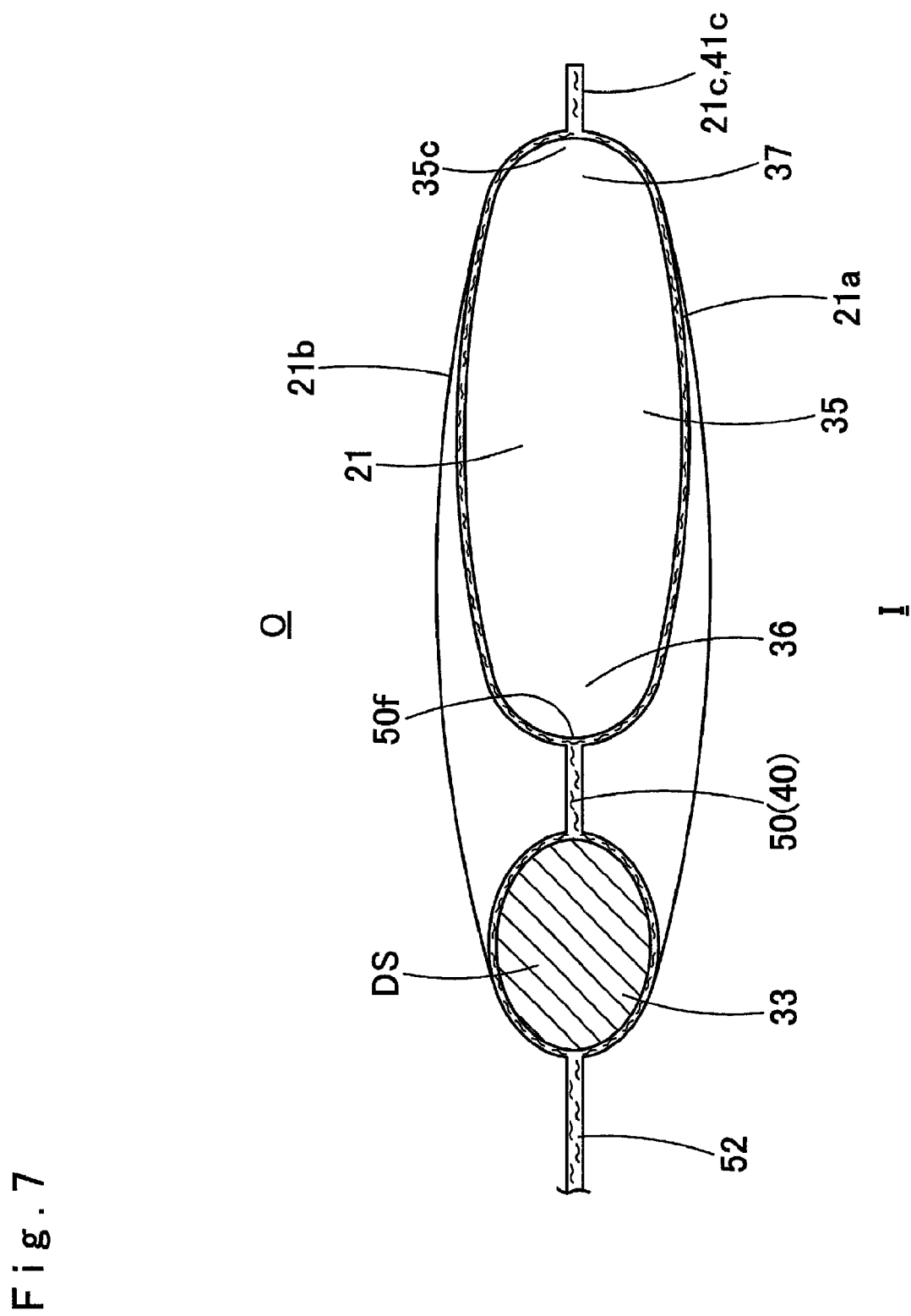
FIG. 7 is a cross-sectional view of the airbag of the embodiment upon inflation taken along the line VII-VII of FIG. 3.

Specifically, the opening area DS of the lower communication port 33, as shown in FIGS. 5 and 7, is set to a range of 5 to 8 times, preferably 6 to 7 times the opening area US of the upper communication port 32. In the embodiment, in a state where the airbag 20 is flatly deployed, the width dimension BD (refer to FIG. 3) of the lower communication port 33 is 100 mm, the width dimension BU of the upper communication port 32 is 40 mm, and the opening area DS of the lower communication port 33 is about 6.3 times the opening area US of the upper communication port 32.

The airbag 20 can be manufactured if the plate-shaped portion 54 is coupled to the front edge of the airbag 20 by sewing or the like and the flow regulating cloth (not shown) is disposed in the joint port 22, after manufacturing by a hollow-weaving method.

When the airbag 20 is folded before mounted on the vehicle, the airbag is folded so that a region at the lower edge 20b of the airbag 20 approaches a region at the upper edge 20a at which the mounting portion 42 is provided. Additionally, when the airbag 20 is deployed and inflated, a folded upper edge portion 56 is housed at a position of the exterior O in a folded state of a lower portion 57 below the upper edge portion 56 so that the inflatable main body portion 35 can be pushed out toward the interior I while riding over the upper end 6a of the rear pillar garnish 6 (refer to FIGS. 9 to 11). The upper edge portion 56 is the gas supply passage 23, the wedging inflatable portion 29, and the front end inflatable portion 28 that extend to the vicinity of the lower edge 23b of the gas supply passage 23, and is a portion at the upper portion of the airbag 20. The lower portion 57 is a portion below the upper edge portion 56, and is the portion of the inflatable main body portion 35 or the communication inflatable portion 30. In the embodiment, the lower portion 57 (the inflatable main body portion 35 and the communication inflatable portion 30) is rolled so that the lower edge 20b is directed toward the exterior O, and the upper edge portion 56 is folded into a bellows shape and arranged at the exterior O of the folded lower portion 57, thereby completing the folding of the airbag 20.

In addition, in the embodiment, this folding is also performed in the front inflatable portion 24 by providing a folding line, a folding width, and the like that coincide with the rear inflatable portion 26.

Here, in the embodiment, when folding is performed so that a region at the lower edge 20b of the airbag 20 approaches a region at the upper edge 20a, as shown in FIG. 8A, a portion behind the mounting portion 42B at the rear end of the airbag 20 is folded in advance. That is, in the airbag 20, the rear edge 20c of the airbag 20 is folded to the front interior so that a vertical folding line VC is imparted to a rear-side portion 58 of the upper communication port 32, and the rear-side portion 58 is overlapped in the vehicle width direction. In that state, the airbag 20 forms a folded-up body 59 in which a folded shape is completed by rolling the lower portion 57 and folding the upper edge portion 56 into a bellows shape.

In the state of the folded-up body 59, the airbag 20 is wound by a breakable wrapping member (not shown) for preventing collapse of folding. Then, if the inflator 13 on which the mounting bracket 14 has been mounted is connected to the joint port 22 of the airbag 20 by the clamp 16, and the mounting bracket 10 is mounted to each mounting portion 42 of the airbag 20, as shown in FIG. 8B, an airbag assembly 60 can be formed.

Thereafter, the airbag assembly 60 is mounted to the body 1 by arranging the respective mounting brackets 10 and 14 at predetermined positions of the inner panel 2 at the body 1, and fastening the mounting bolts 11 and 15 like inserting each mounting hole 42a to fix the respective mounting brackets 10 and 14 to the inner panel 2. Then, if a lead wire (not shown) that extends from a control device for a predetermined operation of the inflator is connected to the inflator 13, the front pillar garnish 4 and the roof head lining 5 are mounted to the body 1, and the rear pillar garnish 6 and the center pillar garnish 7 are mounted to the body 1, the head-protecting airbag apparatus S can be mounted on the vehicle V.

Figure 2:
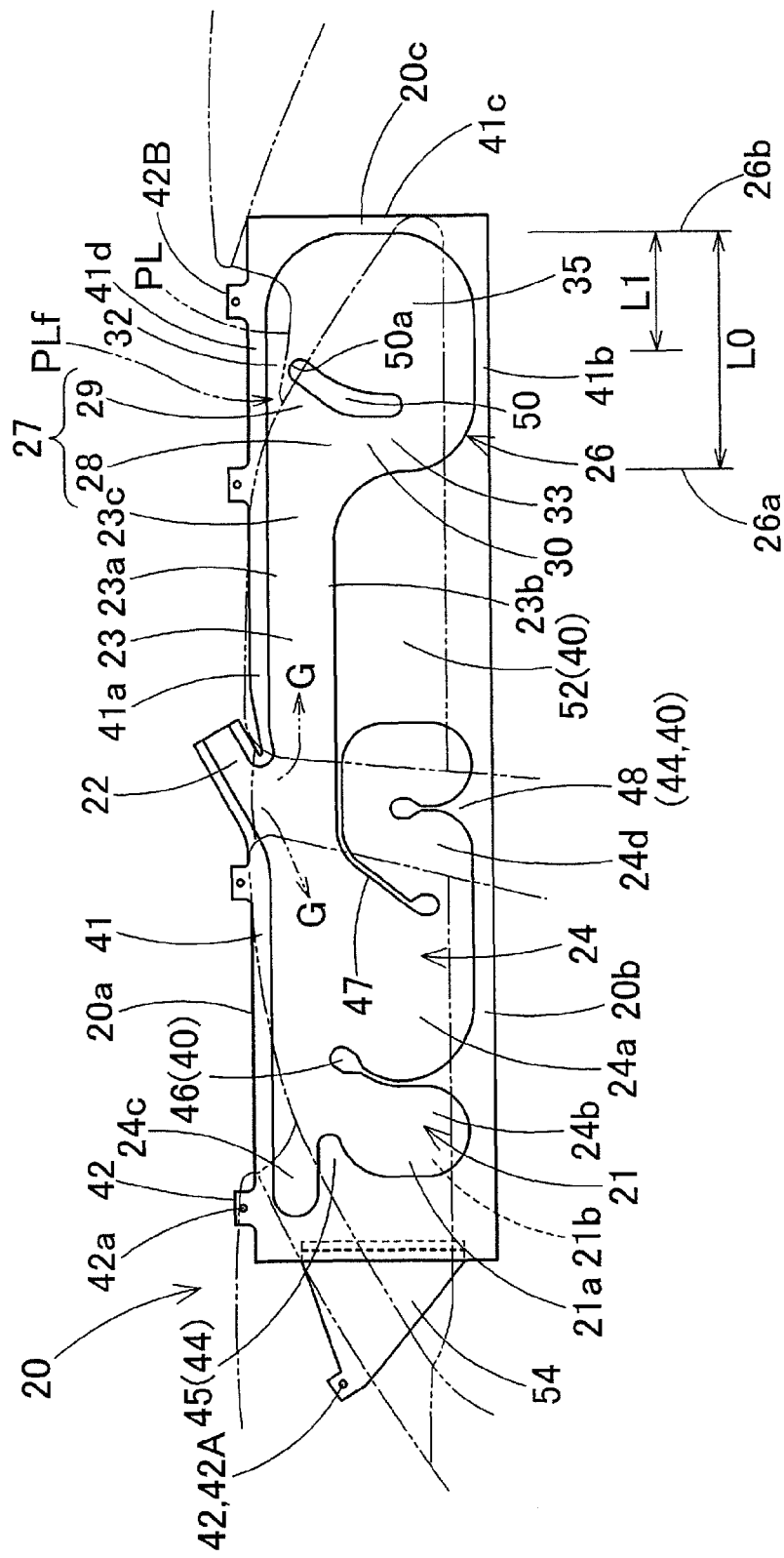
FIG. 2 is a view showing a state where an airbag to be used for the head-protecting airbag apparatus of the embodiment shown in FIG. 1 is flatly deployed.

If the inflator 13 is operated after the head-protecting airbag apparatus S is mounted on the vehicle V, as indicated by two-dot chain lines of FIG. 2, the inflation gas G from the inflator 13 flows into the gas supply passage 23 from the joint port 22 in the airbag 20, flows through the gas supply passage 23 toward both the front and rear, and flows into the front inflatable portion 24 and the rear inflatable portion 26 of the airbag 20. Then, the front inflatable portion 24 and the rear inflatable portion 26 breaks the covered wrapping material (not shown), and pushes open the airbag cover 8 at the lower edges 4a and 5a of the front pillar garnish 4 or the roof head lining 5 to deploy and inflate greatly so as to cover the interior I of the side windows W1 and W2, the center pillar CP, and the rear pillar RP as indicated by two-dot chain lines of FIG. 1 or FIG. 15 while protruding downward.

Figure 9A:
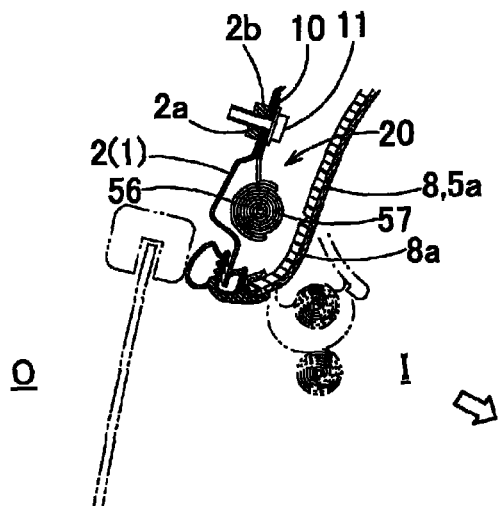
FIGS. 9A, 9B, and 9C are cross-sectional views showing the head-protecting airbag apparatus of the embodiment in operation in order, taken along the position of the line IX-IX of FIG. 3.

In that case, in the initial stage of deployment and inflation of the airbag 20, in the rear inflatable portion 26, the upper edge portion 56 inflates rapidly to push out the lower portion 57 toward the interior I as indicated by two-dot chain lines of FIG. 9A and of FIG. 10A. The upper edge portion 56 includes the gas supply passage 23 arranged along the longitudinal direction, the front end inflatable portion 28 of the inlet inflatable portion 27 connected to the rear side of the gas supply passage 23, and the wedging inflatable portion 29. The lower portion 57 is a portion including the inflatable main body portion 35 located below the upper edge portion 56 upon the completion of inflation. Therefore, in the initial stage of deployment and inflation of the airbag 20, the inflatable main body portion 35 is deployed so as to cover the interior I of the rear pillar RP and the rear window W2 adjacent to the rear pillar RP at the front of the rear pillar while riding over the upper end 6a of the rear pillar garnish 6.

Figure 9B:
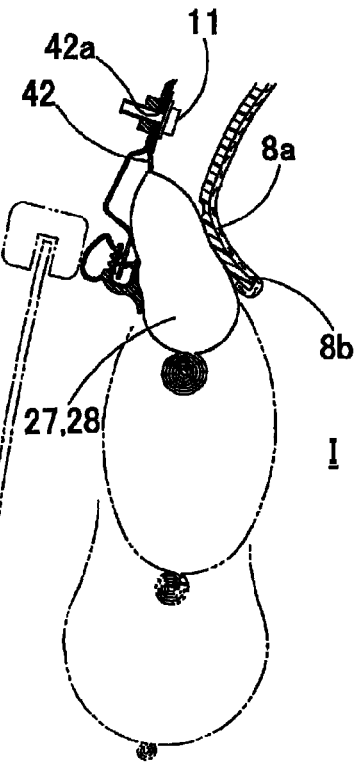

Moreover, as shown in FIG. 9B or FIG. 10B, the inlet inflatable portion 27 is inflated by arranging the wedging inflatable portion 29 at the rear upper portion so as to be like a wedge between the interior I of the upper end 6a of the rear pillar garnish 6 and the exterior O of the lower edge 8d of the pillar-side portion 8c of the airbag cover 8. That is, the wedging inflatable portion 29 maintains its open state by greatly opening the lower edge 8d of the pillar-side portion 8c toward the interior I.

Figure 3:
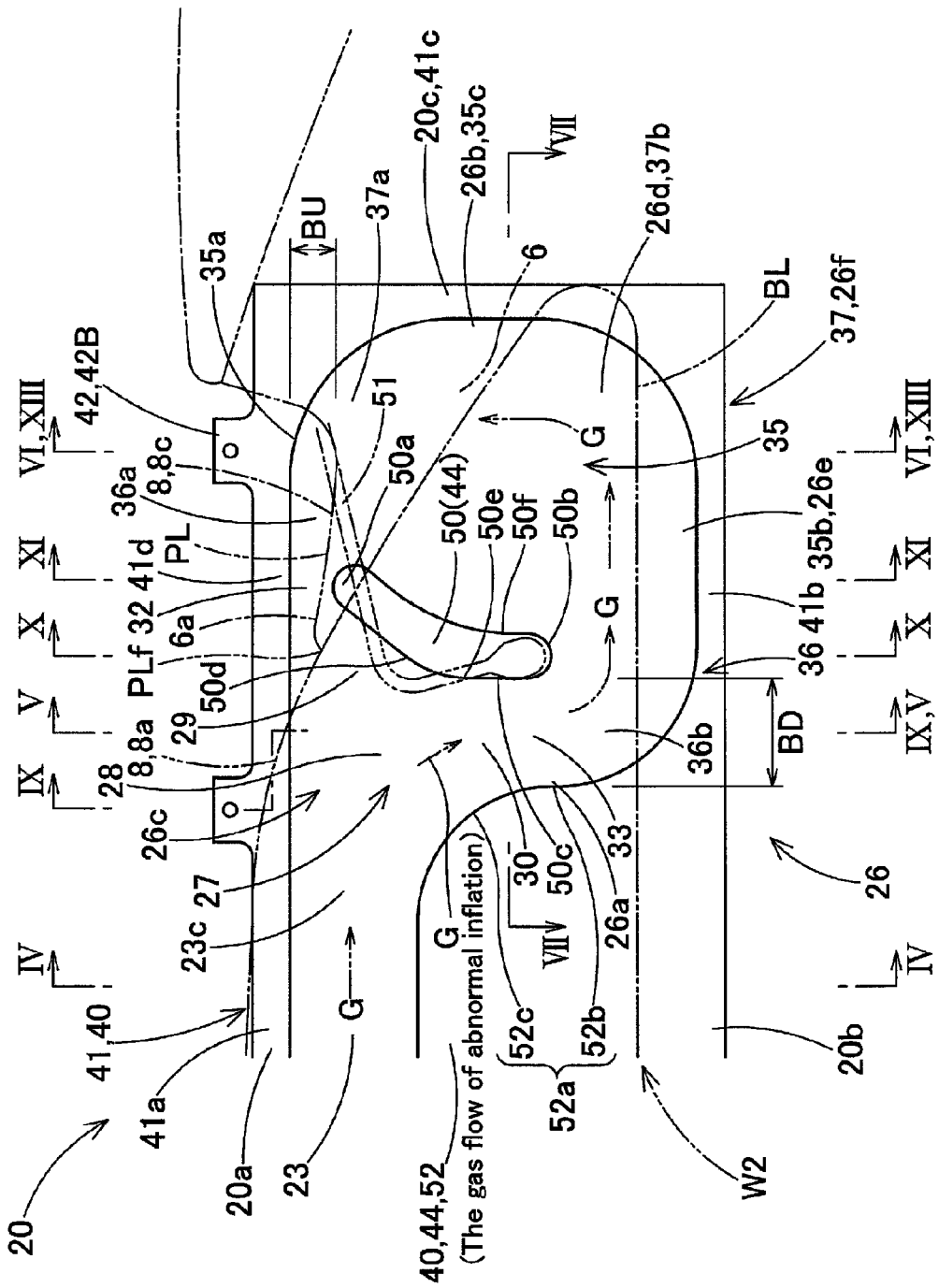
FIG. 3 is a view showing a state where the rear side of the airbag of the embodiment shown in FIG. 1 is flatly deployed.
Figure 4:
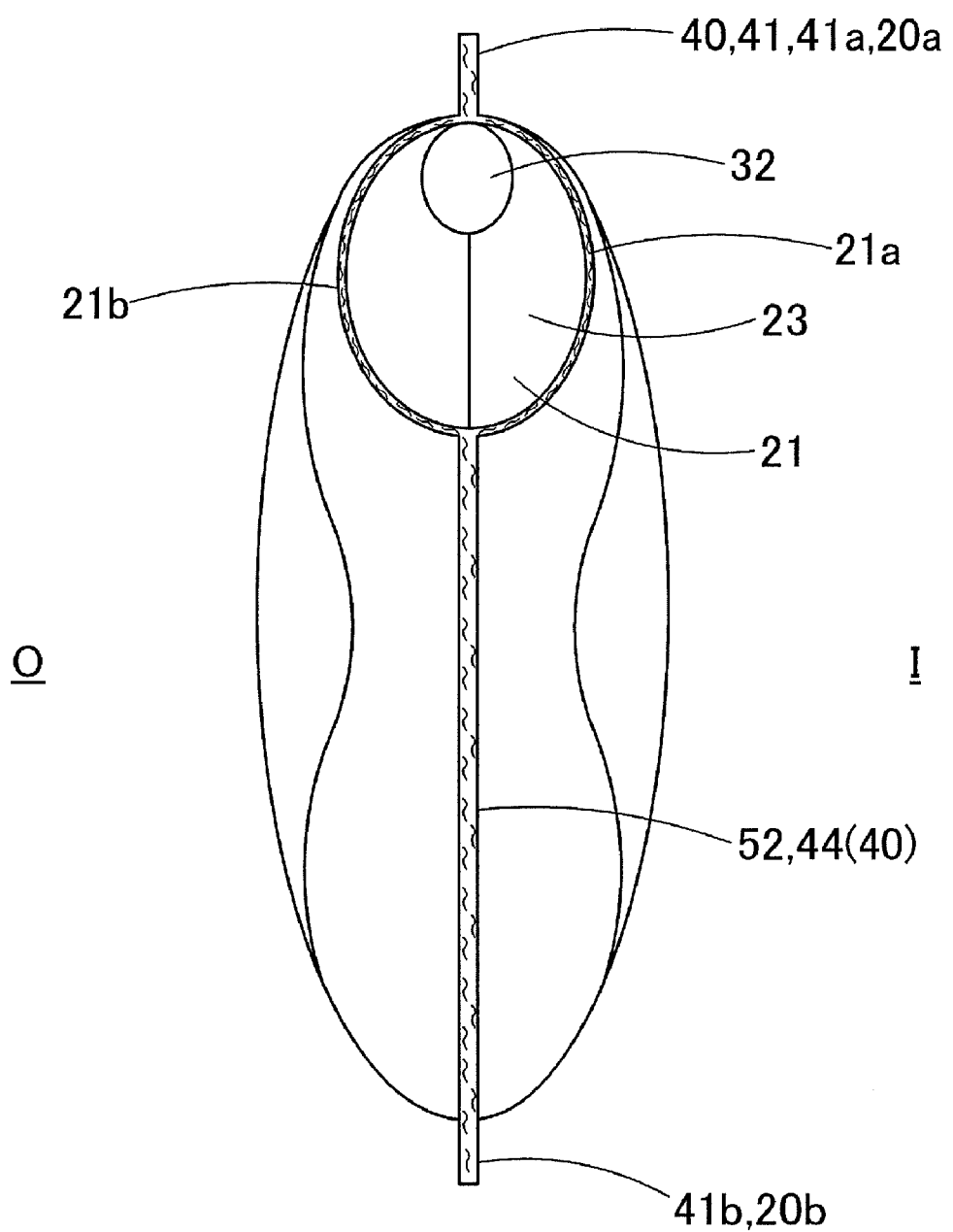
FIG. 4 is a cross-sectional view of the airbag of the embodiment upon inflation taken along the line IV-IV of FIG. 3.

Therefore, the inflatable main body portion 35 pushed out toward the interior I by the inflation of the upper edge portion 56 is inflated along the interior I of the rear window W2 by the inflation gas G that flows in via the lower communication port 33 from the communication inflatable portion 30 of the inlet inflatable portion 27. That is, the inflatable main body portion 35 is inflated by allowing inflation gas G to flow in from the lower communication port 33 having a larger opening area DS than the upper communication port 32. As a result, in the inflatable main body portion 35, as shown in FIG. 3, the inflation gas G flows downward at the rear edge 52a of the plate-shaped closing portion 52, and flows toward the rear lower portion 37b from the front lower portion 36b and upward at the rear upper portion 37a from the rear lower portion 37b, at the lower edge 35b of the inflatable main body portion 35, and the thickness of the inflatable main body portion 35 is increased in order with this flow.

Figure 9C:
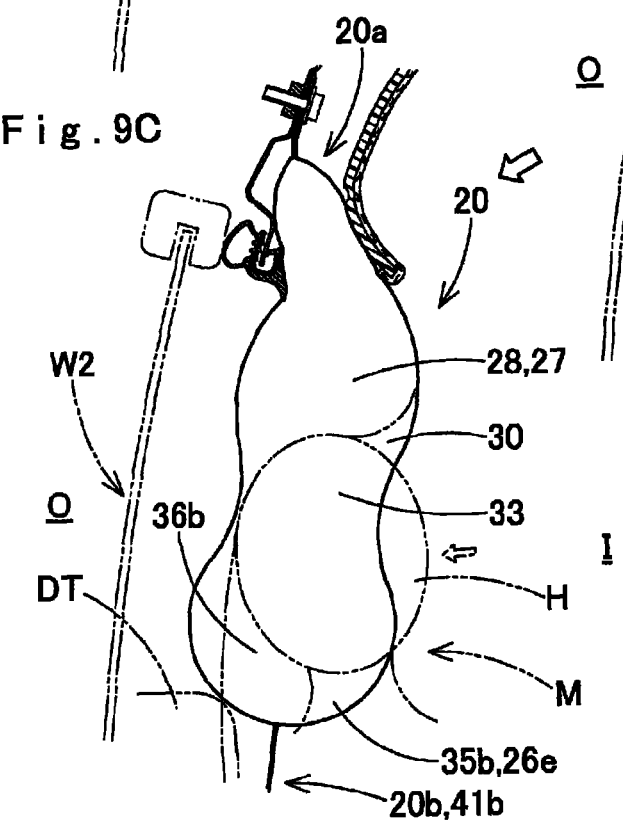
Figure 12A:
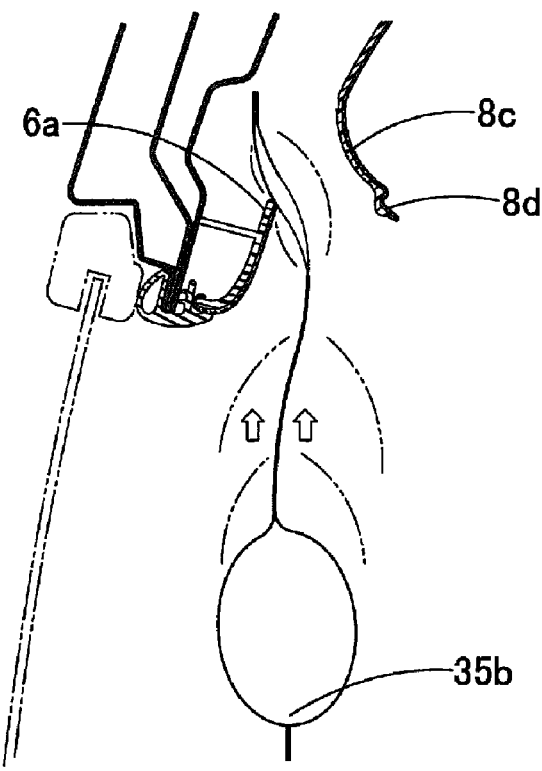
FIGS. 12A and 12B are cross-sectional views showing the head-protecting airbag apparatus of the embodiment in operation in order, and showing the state after B of FIG. 11.
Figure 12B:
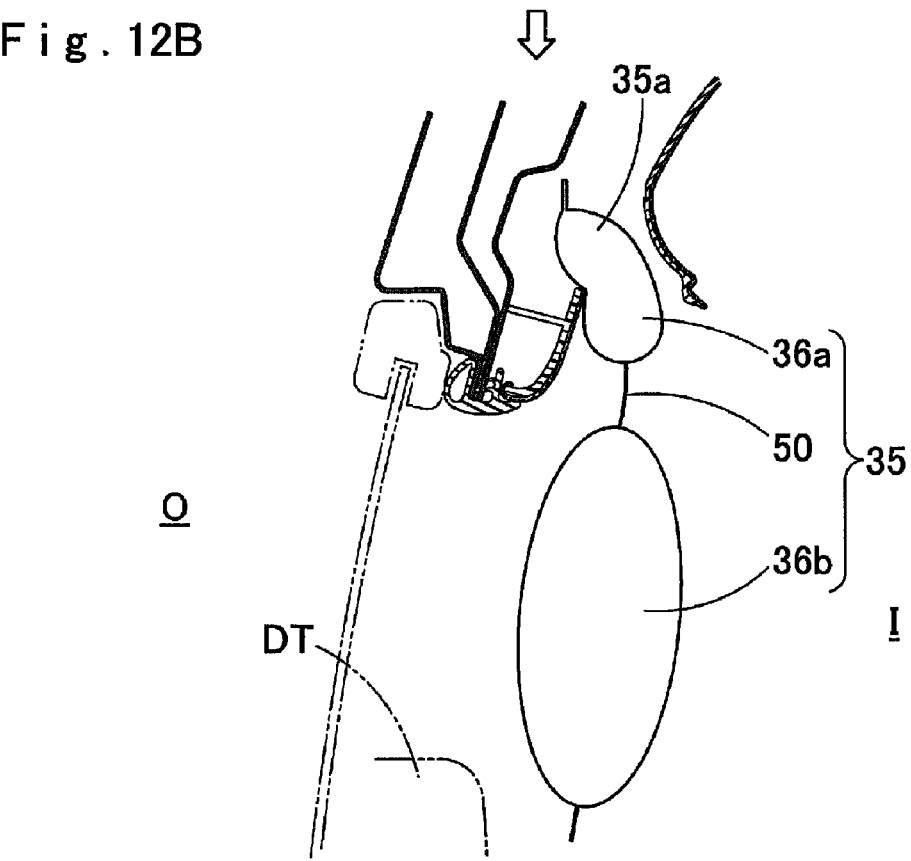
Figure 14A:
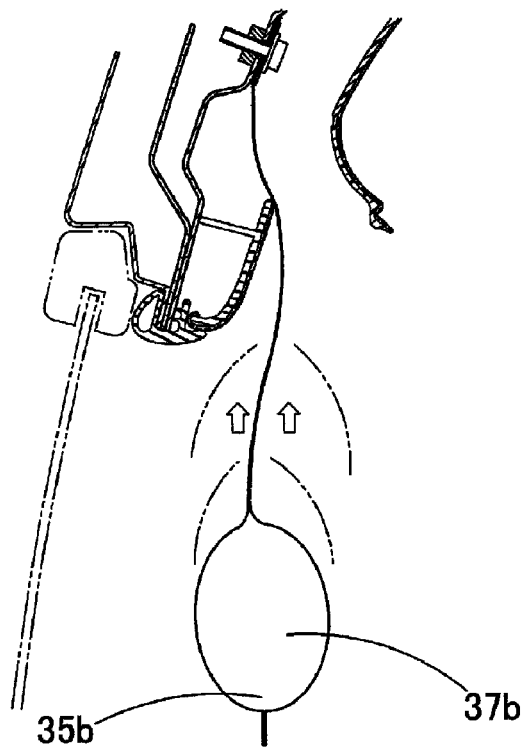
FIGS. 14A and 14B are cross-sectional views showing the head-protecting airbag apparatus of the embodiment in operation in order, and showing the state after B of FIG. 13.
Figure 14B:
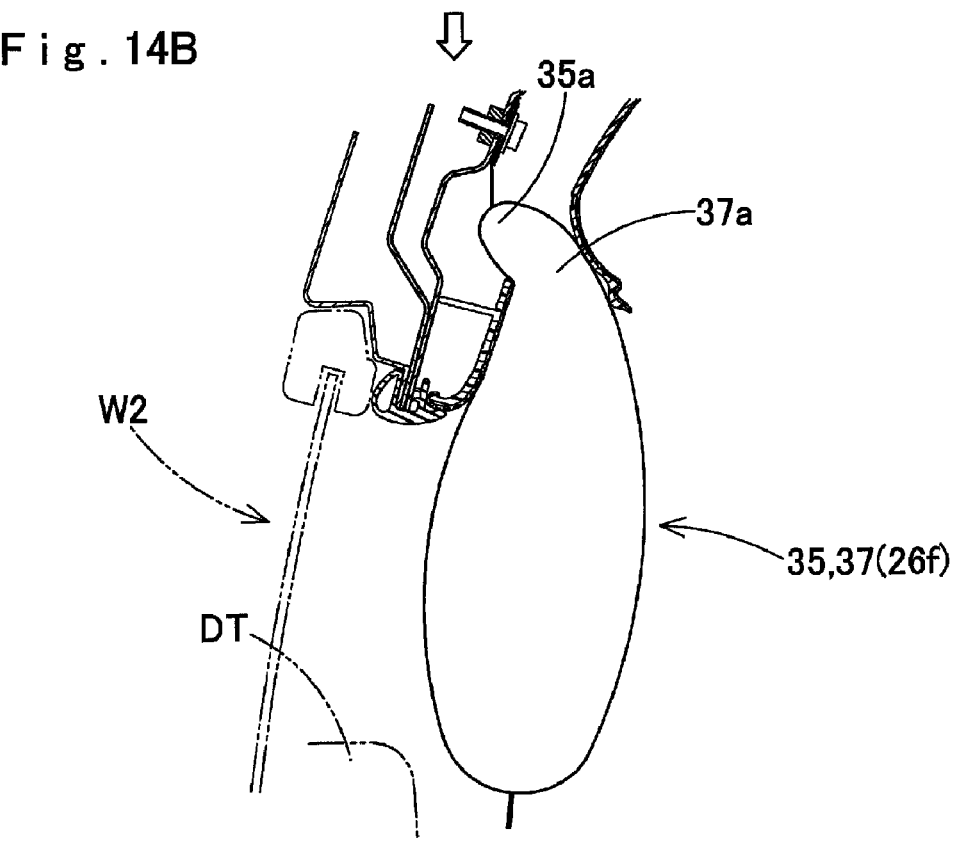

Specifically, as shown in FIGS. 9B and 9C, as the inflation gas G flows downward at the rear edge 52a of the plate-shaped closing portion 52, the communication inflatable portion 30 inflates from the front end inflatable portion 28 of the inlet inflatable portion 27, whereby the front lower portion 36b of the inflatable main body portion 35 inflates. Moreover, when inflation gas G flows to the rear lower portion 37b from the front lower portion 36b at the lower edge 35b of the inflatable main body portion 35, as shown in FIGS. 11A and 11B and FIGS. 13A and 13B, the deployment of the substantially whole region of the lower edge 35b of the inflatable main body portion 35 is already completed, and as shown in FIG. 12A, or FIG. 14A, a region at the lower edge 35b swells at the whole region by the subsequent flow of the inflation gas G from the front lower portion 36b to the rear lower portion 37b. Moreover, as shown in FIG. 12B and FIG. 14B, the whole region at the upper edge 35a also inflates thickly by the flow of the inflation gas G from the rear lower portion 37b to the rear upper portion 37a.

Then, upon the inflation of the inflatable main body portion 35, the wedging inflatable portion 29 of the inlet inflatable portion 27 already secures the push-open state of the pillar-side portion 8c of the airbag cover 8. Therefore, even if the portion of the inflatable main body portion 35 in the vicinity of the upper communication port 32 does not swell, the rear lower portion 37b of the inflatable main body portion 35 therebelow is arranged so as to be dragged and smoothly deployed downward by the front portion 36 of the inflatable main body portion 35 pushed out toward the interior I upon inflation, of the gas supply passage 23 and the inlet inflatable portion 27, to cover the interior I of the rear pillar garnish 6. Therefore, the inflatable main body portion 35 can be smoothly inflated so that the thickness thereof is increased after deployment.

On the other hand, when the inflatable main body portion 35 is pushed out toward the interior I by the inflation of the inlet inflatable portion 27 and the gas supply passage 23 and is deployed toward the interior I of the rear window W2 and the rear pillar garnish 6, for example, as indicated by two-dot chain lines of FIG. 16 and two-dot chain lines of FIG. 9C, the inflatable main body portion 35 is made to complete its inflation as follows in a case where the head H of an occupant M moves in the direction of the exterior O at the lower portion of the inlet inflatable portion 27 to block the vicinity of the lower communication port 33 so as to regulate the flow of the inflation gas G, that is, in the case of abnormal inflation of the airbag 20.

Figure 16:
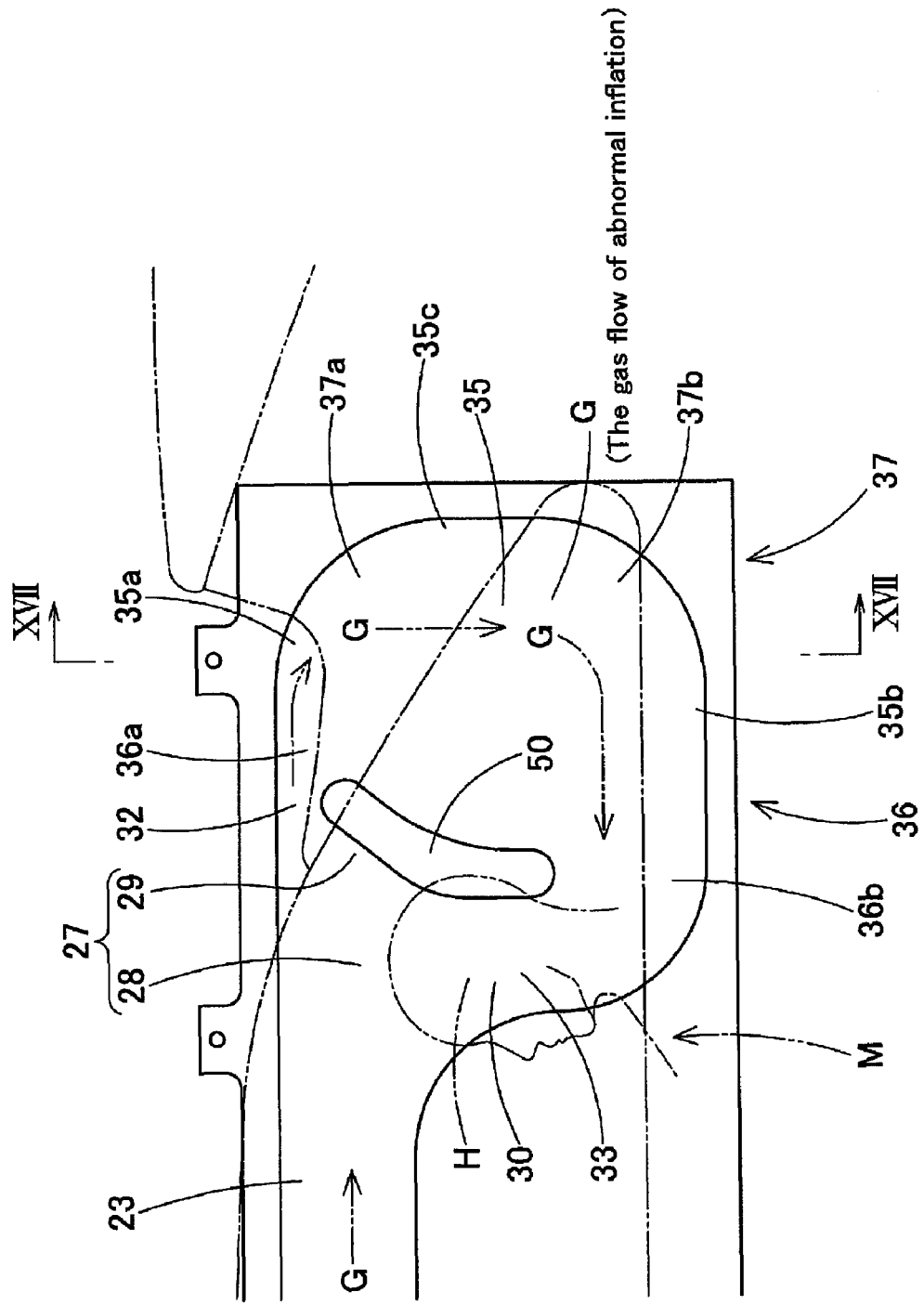
FIG. 16 is a view illustrating the airbag of the embodiment shown in FIG. 1 upon abnormal inflation.
Figure 18A:
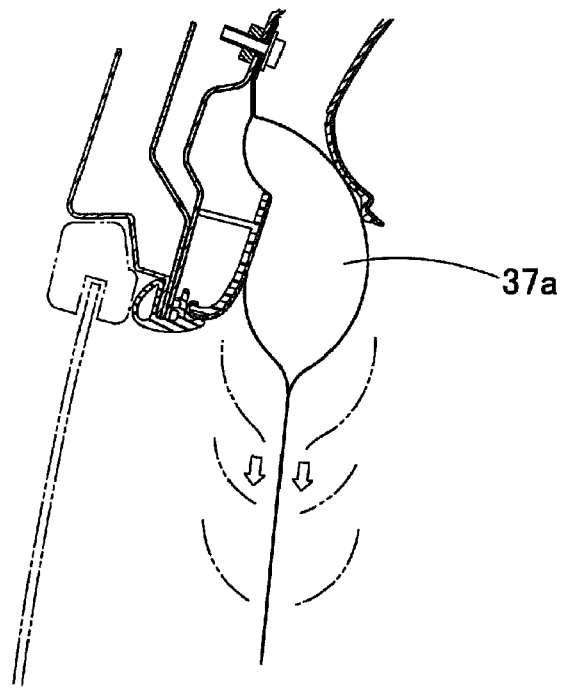
FIGS. 18A and 18B are cross-sectional views showing the head-protecting airbag apparatus of the embodiment in operation in order, and showing the state after B of FIG. 17.
Figure 18B:
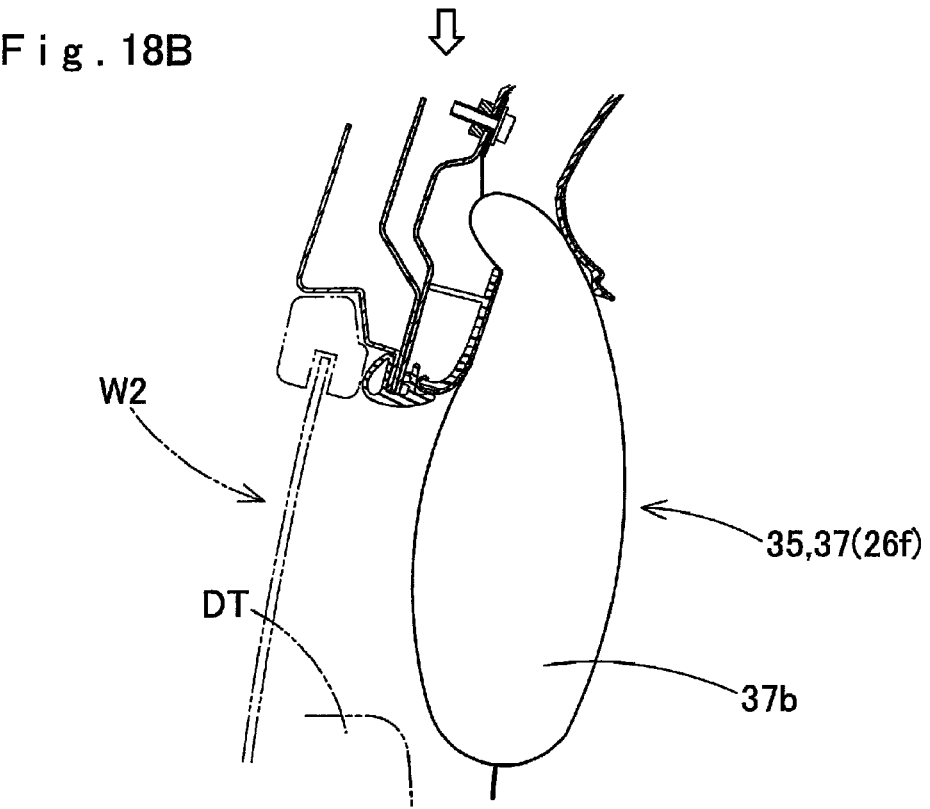

That is, as shown in FIG. 16, inflation gas G flows into the upper edge 35a of the inflatable main body portion 35 via the upper communication port 32 from the wedging inflatable portion 29 of the inlet inflatable portion 27. Moreover, the inflation gas G flows toward the lower edge 35b from the upper edge 35a at the rear edge 35c, and flows forward at the lower edge 35b. At this time, substantially similarly to those shown in FIGS. 13A and 13B, the inflatable main body portion 35 is deployed to the lower edge 35b in advance, as shown in FIGS. 17A and 17B. Therefore, in the inflatable main body portion 35, the front upper portion 36a connected to the upper communication port 32 inflates and the rear upper portion 37a inflates, by the inflow of the inflation gas G. Then, as shown in FIGS. 18A and 18B, the inflatable main body portion 35 swells from the rear upper portion 37a toward the rear lower portion 37b, and inflates from the rear lower portion 37b to the front lower portion 36b so that the thickness thereof is increased.

As a result, since the inflatable main body portion 35 can be inflated to cover the interior I of the rear pillar garnish 6 and the rear window W2 in the vicinity of the rear pillar garnish 6, the head H of the occupant M received and stopped in the vicinity of the lower communication port 33 can be prevented from moving to the exterior O, and the occupant M can be stably restrained to the interior I.

Accordingly, in the head-protecting airbag apparatus S of the embodiment, through the simple configuration of the airbag 20 itself according to the setting of the opening areas US and DS of the upper communication port 32 and the lower communication port 33 and the setting of the inlet inflatable portion 27 in the airbag 20, a region at the rear portion of the airbag 20 can be smoothly and stably deployed and inflated toward the interior I in the vicinity of the rear pillar RP. As a result, the stable restraint performance of the occupant M can be exhibited in the head-protecting airbag apparatus S of the embodiment.

In the head-protecting airbag apparatus S of the embodiment, the airbag 20 is disposed such that the belt-shaped closing portion 50 has a boomerang shape in which the upper end 50a is offset rearward from the lower end 50b as seen from the interior I. Additionally, in the airbag 20, the upper communication port 32 is disposed between the upper end 50a of the belt-shaped closing portion 50, and the rear upper portion 41d disposed along the longitudinal direction of the upper edge 41a of the peripheral edge portion 41.

Figure 6:
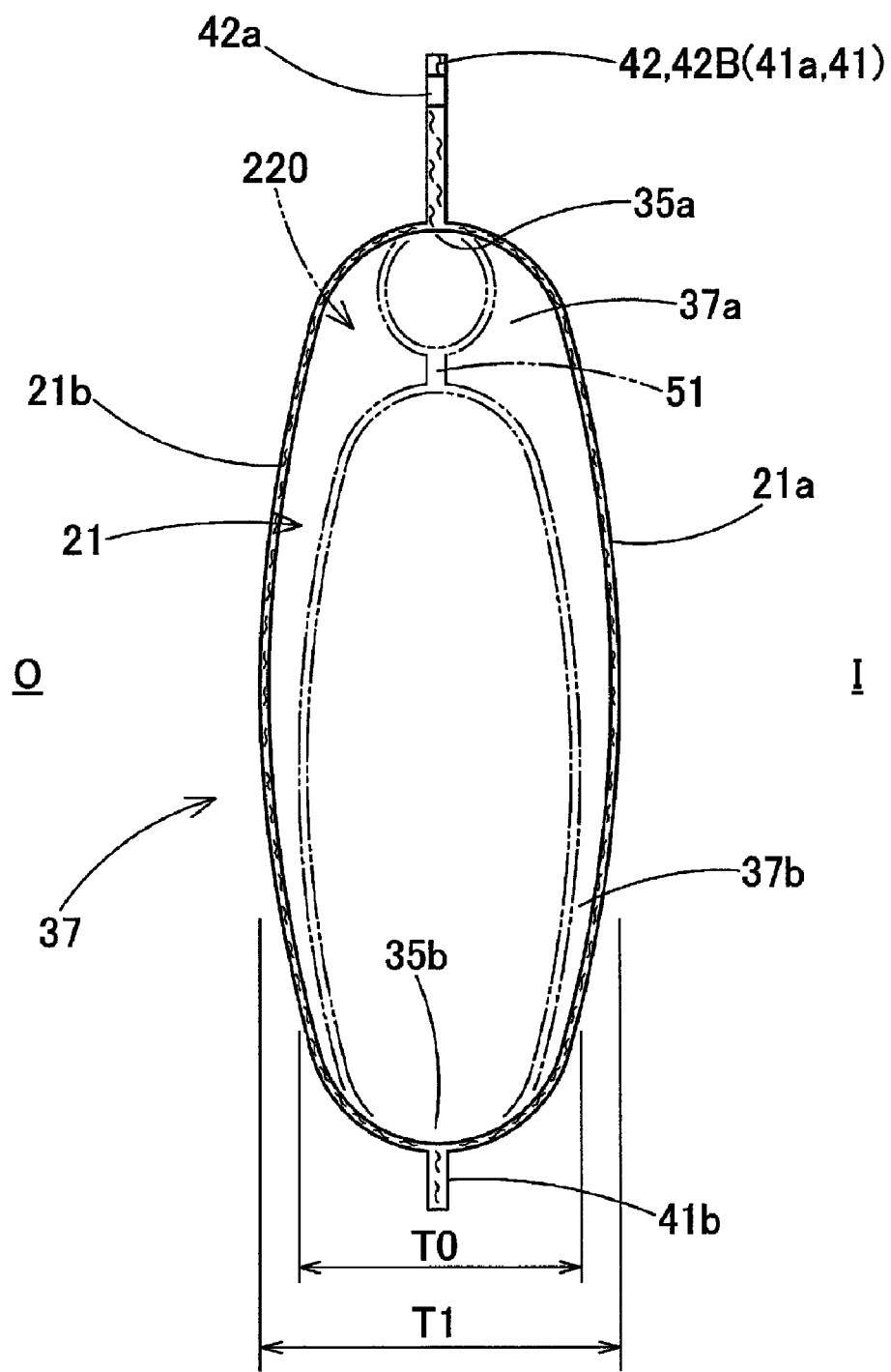
FIG. 6 is a cross-sectional view of the airbag of the embodiment upon inflation taken along the line VI-VI of FIG. 3.

That is, in the embodiment, the inflatable main body portion 35 does not provide the closing portion 44 in a range from the lower edge of the rear inflatable portion 26 to the upper edge thereof behind the belt-shaped closing portion 50 of the airbag 20. Therefore, the inflatable main body portion 35 can inflate the rear portion 37 vertically broadly and thickly, as shown in FIG. 6, FIG. 14B, and FIG. 18B. Accordingly, if the airbag 20 is made to complete its inflation, the rear inflatable portion 26 can receive and stop the occupant's head with excellent cushioning properties, in a vertically wide range at the rear portion 26f.

In addition, the closing portion 51 indicated by two-dot chain lines of FIGS. 3 and 6, similarly to the related art, is disposed so as to be coupled to the rear edge 41c of the peripheral edge portion 41. In the case where the closing portion 51 is provided, the thickness dimension T0 of the rear portion 37 in the vehicle width direction is smaller than the thickness dimension T1 of the embodiment by providing the closing portion 51 as in an airbag 220 of FIG. 6.

Figure 19:
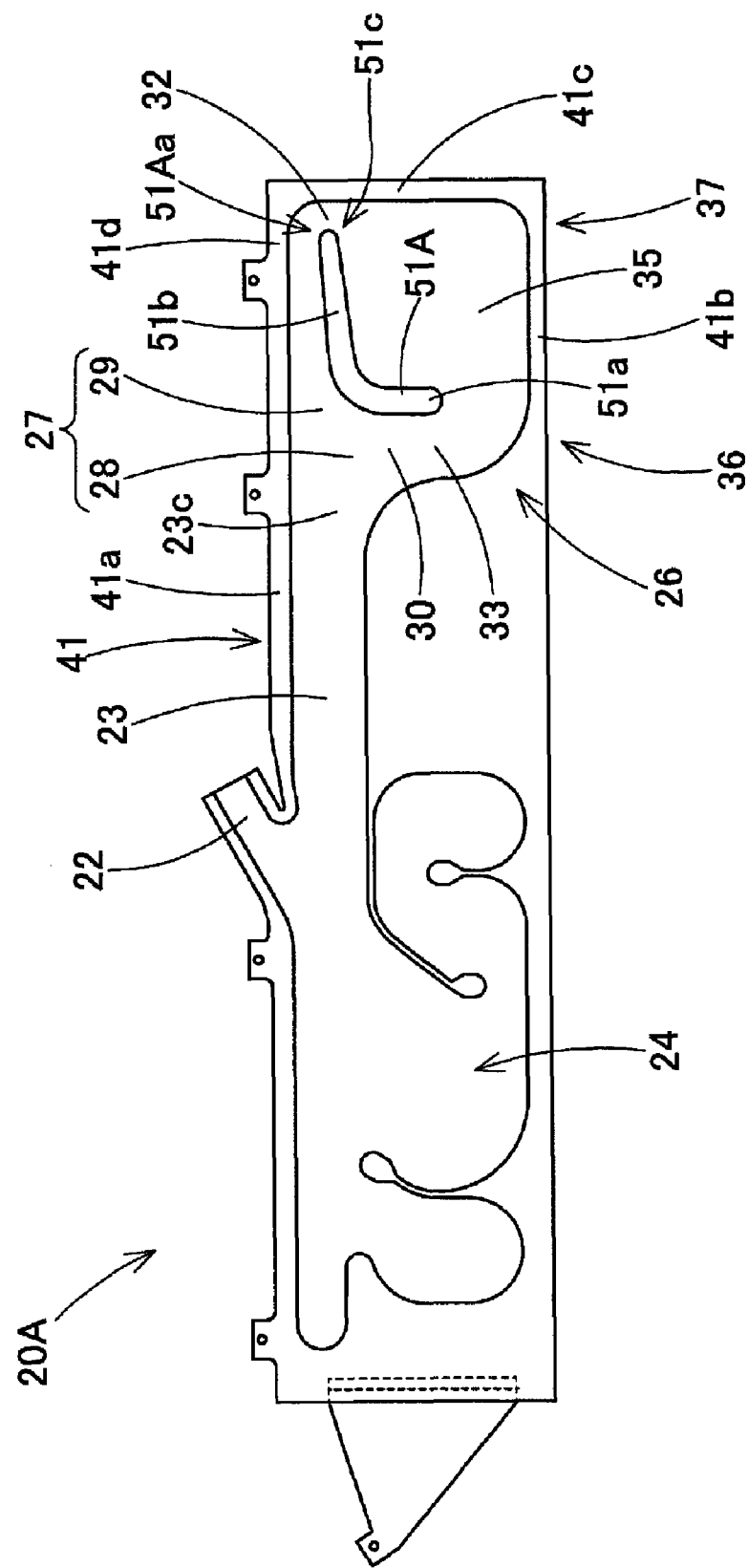
FIG. 19 is a view showing a modification of the airbag of the embodiment.

Incidentally, as in an airbag 20A shown in FIG. 19, a belt-shaped closing portion 51A may have a boomerang shape having a vertical line portion 51a that extends vertically, and a horizontal line portion 51b that extends rearward from an upper end of the vertical line portion 51a. In the belt-shaped closing portion 51A, the upper communication port 32 is disposed between a distal end (rear end) 51c of the horizontal line portion 51b at an upper end 51Aa and the rear edge 41c of the peripheral edge portion 41. In the airbag 20A, it is difficult to the thickness dimension in the rear portion 37. However, even in the airbag 20A, upon normal inflation and abnormal inflation, the upper communication port 32 and the lower communication port 33 can smoothly deploy and inflate the inflatable main body portion 35 in cooperation with each other, similarly to the embodiment.

In addition, the embodiment has showed the case where the lower communication port 33 is disposed between the belt-shaped closing portion 50 and the plate-shaped closing portion 52. However, the lower communication port 33 may be disposed between the lower end 50b of the belt-shaped closing portion 50 and the lower edge 41b of the peripheral edge portion 41.

Additionally, in the embodiment, the upper communication port 32 is disposed between the upper end 50a of the belt-shaped closing portion 50 and the rear upper portion 41d of the peripheral edge portion 41, so as to thickly swell a region at the rear portion 37 of the inflatable main body portion 35. In this case, it is desirable that the length dimension L1 (refer to FIG. 2) between a region at the upper end 50a of the belt-shaped closing portion 50 and the rear edge 35c of the inflatable main body portion 35 is in a range of ⅓ to ⅔ (½ in the embodiment) of the length dimension L0 from the front edge 26a of the rear inflatable portion 26 to the rear edge 26b thereof in a state where the lower communication port 33 can be secured. In such a configuration, the inflatable main body portion 35 can be inflated with excellent cushioning properties in a longitudinal wide range from the upper edge 20a of the airbag 20 to the lower edge 20b thereof.

Moreover, in the head-protecting airbag apparatus S of the embodiment, the opening area DS of the lower communication port 33 is set in a range of 5 to 8 times, preferably, to 6.3 times in a range of 6 to 7 times the opening area US of the upper communication port 32. Therefore, the airbag 20 can deploy and inflate smoothly upon both the normal inflation of the airbag 20 and upon abnormal inflation in which the lower communication port 33 is obstructed.

That is, if the opening area DS of the lower communication port 33 is made less than 5 times the opening area US of the upper communication port 32, the opening area US of the upper communication port 32 is made relatively excessively larger than the opening area DS of the lower communication port 33. Therefore, upon the normal inflation of the airbag 20, the amount of inflow of inflation gas G that flows into the inflatable main body portion 35 from the upper communication port 32 increases, and the inflation gas G from the upper communication port 32 collides with the inflation gas G that flows in from the lower communication port 33. As a result, in the airbag 20, it is difficult to secure the behavior upon normal inflation, that is, the behavior that the inflatable main body portion 35 inflates stably along the rear window W2 such that the inflatable main body portion inflates in order from the front lower portion 36b of the inflatable main body portion 35 toward the rear lower portion 37b and further from the rear lower portion 37b toward the rear upper portion 37a. That is, in a case where the opening area DS of the lower communication port 33 is set to less than 5 times the opening area US of the upper communication port 32, the inflatable main body portion 35 is apt to have the behavior that wobbles and inflates in the vehicle width direction, which is not preferable.

On the other hand, if the opening area DS of the lower communication port 33 is made to exceed 8 times the opening area US of the upper communication port 32, the opening area US of the upper communication port 32 is made relatively excessively smaller than the opening area DS of the lower communication port 33. Therefore, upon the abnormal inflation of the airbag 20, the amount of inflow of inflation gas G that flows into the inflatable main body portion 35 from the upper communication port 32 decreases, and the inflation of the portion ranging from the vicinity of the rear lower portion 37b of the inflatable main body portion 35 to the vicinity of the lower communication port 33 is delayed. As a result, in a case where the opening area DS of the lower communication port 33 is made to exceed 8 times the opening area US of the upper communication port 32, it is difficult for the inflatable main body portion 35 to exhibit rapid restraint performance, which is not preferable.

Moreover, in the head-protecting airbag apparatus S of the embodiment, the airbag 20 is adapted such that the lower edge 26e of the rear inflatable portion 26 is arranged up to below a belt line BL at the lower edge of the rear window W2 upon the completion of deployment and inflation.

In such a configuration, the rear inflatable portion 26 covers the upper edge of the rear window W2 to the lower edge thereof in front of the rear pillar garnish 6 upon the completion of inflation of the airbag 20. Moreover, since the rear inflatable portion 26 can be supported by a lower edge member DT, such as a door trim of the rear window W2 without using the lower edge 26e itself as a free end, the rear inflatable portion 26 is not easily moved to the exterior. Therefore, even if the rear inflatable portion 26 of the airbag 20 can restrain an occupant who is directed to the exterior O via the rear window W2 to the interior I more exactly, not only upon normal inflation but also upon abnormal inflation.

Particularly, in the embodiment, upon the completion of inflation of the airbag 20, the vicinity of the lower edge 35b of the inflatable main body portion 35 is arranged below the belt line BL, and the exterior O at the lower edge 35b of the inflatable main body portion 35 is supported by the lower edge member DT. Therefore, in the embodiment, the restraint performance can be further enhanced, and the behavior of an occupant M who sneaks through a region at the lower edge 20b of the airbag 20 can be exactly prevented.

Moreover, in the head-protecting airbag apparatus S of the embodiment, as shown in FIG. 8B and FIG. 8B, the folding shape of the folded-up body 59 of the airbag 20 is set to a shape by the following folding. That is, first, the rear edge 20c of the airbag 20 is folded forward so that the vertical folding line VC is imparted to the rear side of the mounting portion 42B at the rear end from a state where the airbag 20 is made flat, and the rear-side portion 58 of the upper communication port 32 is overlapped in the vehicle width direction. Subsequently, there is provided a shape folded so that a region at the lower edge 20b of the airbag 20 approaches a region at the upper edge 20a.

Therefore, in the current embodiment, by folding and housing the rear inflatable portion 26 at the rear portion of the airbag 20, it can be deployed and inflated while extending rearward as much as it has been folded. As a result, in the embodiment, even if the airbag is compactly housed at the rear portion of the airbag 20, the interior I of the rear pillar garnish 6 and the rear window W2 can be covered in a wide range upon the completion of inflation.

Additionally, in such a configuration, even if a region at the rear edge 35c of the inflatable main body portion 35 upon the completion of deployment and inflation is arranged at the rear side apart from the inlet inflatable portion 27, the region at the rear edge is folded and arranged at the front side close to the inlet inflatable portion 27 upon folding and housing. Therefore, in an early stage of inflation, as shown in FIGS. 13A and 13B and FIGS. 17A and 17B, the vicinity of the inlet inflatable portion 27 smoothly pushes out a region at the rear edge 35c of the inflatable main body portion 35 upon the completion of deployment and inflation toward the interior I while riding over the upper end 6a of the rear pillar garnish 6. Thereafter, the inflatable main body portion 35 can be smoothly deployed in a state where the region at the rear edge 35c is extended, while eliminating the folding line VC that is folded forward. That is, even if the rear edge 35c is folded forward and housed, the whole region of the inflatable main body portion 35 can be smoothly deployed and inflated.

In addition, in the embodiment, when the rear edge 20c of the airbag 20 is folded forward, the rear edge is folded toward the interior. However, this forward folding may be performed such that the rear edge 20c is folded to the exterior or the rear edge 20c enters the inflatable main body portion 35.

What is claimed is:

1. A head-protecting airbag apparatus comprising an airbag that is folded and housed at an upper edge of a window inside a vehicle, the airbag pushing an airbag cover open and deploying and inflating downward to cover the window upon inflow of inflation gas,
   wherein the vehicle comprises a rear pillar, a rear window adjacent to the rear pillar at the front of the rear pillar, and a pillar garnish covering the interior of the rear pillar,
   wherein the airbag is disposed so as to be mounted to a vehicle body of the vehicle at an upper edge thereof upon the completion of inflation,
   wherein the airbag comprises:
   a gas inflow portion that swells so as to allow inflation gas to flow thereinto and separate an interior wall portion and an exterior wall portion; and
   a gas non-inflow portion that inhibits inflation gas from flowing thereinto in a state where the interior wall portion and the exterior wall portion are coupled together,
   wherein the gas inflow portion comprises:
   a rear inflatable portion arranged at a rear portion of the airbag to cover the interior of the pillar garnish and the rear window; and
   a gas supply passage arranged along a longitudinal direction at an upper edge at the front of the rear inflatable portion upon the completion of inflation to supply the inflation gas to the rear inflatable portion,
   wherein the rear inflatable portion comprises:
   an inflatable main body portion that inflates in an area including a rear lower portion of the rear inflatable portion; and
   an inlet inflatable portion that communicates with a rear end of the gas supply passage, and inflates in an area including a front upper portion of the rear inflatable portion,
   wherein the inlet inflatable portion comprises:
   a wedging inflatable portion that is arranged at a rear upper portion of the inlet inflatable portion and that is disposed so as to inflate continuously in an area ranging from the front of at least a front end portion of an interior parting line between an upper end of the pillar garnish in the state of the airbag cover before opening and a lower edge of the airbag cover to upper and lower portions of the front end portion, and is disposed so as to be like a wedge between the interior of the upper end of the pillar garnish and the exterior of the lower edge of the opened airbag cover upon the deployment and inflation of the airbag; and a communication inflatable portion that is arranged at a front lower portion of the inlet inflatable portion to communicate with a region at a front lower portion of the inflatable main body portion,
   wherein the airbag is folded and housed such that an upper edge portion thereof up to the vicinity of a lower edge of the gas supply passage at an upper edge of the airbag is arranged closer to the exterior than a portion below the upper edge portion of the airbag, at least at a rear portion thereof,
   wherein the gas non-inflow portion comprises:
   a peripheral edge portion that surrounds the gas supply passage and the rear inflatable portion;
   a belt-shaped closing portion that is arranged between the inflatable main body portion and the inlet inflatable portion apart from the peripheral edge portion to partition the inflatable main body portion and the inlet inflatable portion; and
   a plate-shaped closing portion that is arranged in front of the rear inflatable portion and is disposed in an area extending upward from a lower edge of the peripheral edge portion to the gas supply passage,
   wherein an upper communication port that allows the inflatable main body portion and the wedging inflatable portion of the inlet inflatable portion to communicate with each other is disposed between a region at an upper end of the belt-shaped closing portion or an upper edge or rear edge of the peripheral edge portion,
   wherein a lower communication port that allows the inflatable main body portion and the communication inflatable portion of the inlet inflatable portion to communicate with each other is disposed between a region at a lower end of the belt-shaped closing portion and a lower edge of the plate-shaped closing portion or the peripheral edge portion,
   wherein the upper communication port and the lower communication port are disposed such that the opening area of the lower communication port is made larger than the opening area of the upper communication port
   so as to suppress the flow of inflation gas that reaches a rear lower portion of the inflatable main body portion via the upper communication port from the inlet inflatable portion that has inflated the wedging inflatable portion, to allow the inflation gas to flow to reach the rear lower portion of the inflatable main body portion via the lower communication port from the communication inflatable portion of the inlet inflatable portion, upon normal inflation of the airbag and
   so as to make the inflation gas flow to reach the rear lower portion of the inflatable main body portion via the upper communication port from the wedging inflatable portion of the inlet inflatable portion that has inflated the wedging inflatable portion upon the abnormal inflation of the airbag that inflates in a state where the inflow of the inflation gas from the lower communication port of the inflatable main body portion is regulated.

2. The head-protecting airbag apparatus according to claim 1,
   wherein the airbag is disposed such that the belt-shaped closing portion has a boomerang shape in which the upper end is offset rearward from the lower end as seen from the interior, and the upper communication port is disposed between the region at the upper end of the belt-shaped closing portion, and a portion disposed along the longitudinal direction of the upper edge of the peripheral edge portion.

3. The head-protecting airbag apparatus according to claim 2,
wherein the airbag is adapted such that the longitudinal length dimension between the upper end of the belt-shaped closing portion and the rear edge of the inflatable main body portion is set to a range of 1/3 to 2/3 of the longitudinal length dimension from the front edge of the rear inflatable portion to the rear edge thereof as a state where the lower communication port can be secured.

4. The head-protecting airbag apparatus according to claim 1,
wherein the airbag is adapted such that the belt-shaped closing portion has a boomerang shape having a vertical line portion that extends vertically, and a horizontal line portion that extends rearward from an upper end of the vertical line portion, and
the upper communication port is disposed between a rear end of the horizontal line portion at an upper end of the belt-shaped closing portion and the rear edge of the peripheral edge portion.

5. The head-protecting airbag apparatus according to claim 1,
wherein the opening area of the lower communication port is set in a range of 5 to 8 times the opening area of the upper communication port.

6. The head-protecting airbag apparatus according to claim 1,
wherein the airbag is adapted such that the lower edge of the rear inflatable portion is arranged up to below a belt line at the lower edge of the rear window upon the completion of deployment and inflation.

7. The head-protecting airbag apparatus according to claim 1,
wherein the folded-up shape of the airbag in the folding of making a region at the lower edge of the airbag when the airbag is housed approach a region at the upper edge is configured as a folding shape in which the region at the lower edge of the airbag is made to approach the region at the upper edge,
in a state where the rear edge of the airbag is folded forward so that a vertical folding line is imparted to the rear side of the mounting portion at the rear end of the airbag to the vehicle body, and the rear-side portion of the upper communication port is overlapped in the vehicle width direction.

\* \* \* \* \*